(12) United States Patent
Gresset et al.

(10) Patent No.: US 10,250,307 B2
(45) Date of Patent: Apr. 2, 2019

(54) METHOD FOR SETTING COOPERATION PARAMETERS OF COMMUNICATION SYSTEM, COMPUTER PROGRAM THEREOF, INFORMATION STORAGE MEANS THEREOF, AND COMMUNICATION SYSTEM INCLUDING PLURALITY OF NODE DEVICES

(71) Applicant: MITSUBISHI ELECTRIC CORPORATION, Tokyo (JP)

(72) Inventors: Nicolas Gresset, Rennes (FR); David Gesbert, Rennes (FR); Qianrui Li, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 279 days.

(21) Appl. No.: 15/503,677

(22) PCT Filed: Sep. 25, 2015

(86) PCT No.: PCT/JP2015/078004
§ 371 (c)(1),
(2) Date: Feb. 13, 2017

(87) PCT Pub. No.: WO2016/052719
PCT Pub. Date: Apr. 7, 2016

(65) Prior Publication Data
US 2017/0272284 A1 Sep. 21, 2017

(30) Foreign Application Priority Data
Sep. 30, 2014 (EP) .................................. 14187060

(51) Int. Cl.
*H04B 7/0456* (2017.01)
*H04B 7/06* (2006.01)
(Continued)

(52) U.S. Cl.
CPC ........... *H04B 7/0456* (2013.01); *H04B 7/024* (2013.01); *H04B 7/0413* (2013.01);
(Continued)

(58) Field of Classification Search
CPC ............... H04W 24/10; H04W 72/085; H04W 72/1231; H04B 7/0456; H04B 7/0478;
(Continued)

(56) References Cited

U.S. PATENT DOCUMENTS

| 2009/0274225 A1 | 11/2009 | Khojastepour et al. | |
| 2010/0254474 A1* | 10/2010 | Gomadam, Sr. ..... | H04B 7/0417 375/267 |
| 2013/0079009 A1* | 3/2013 | Aumann ............... | H04W 16/02 455/436 |

OTHER PUBLICATIONS

Apelfröjd et al., "Robust Linear Precoder for Coordinated Multi-point Joint Transmission under Limited Backhaul with Imperfect CSI", 2014 IEEE, pp. 138-143.
(Continued)

*Primary Examiner* — Ashley Shivers
(74) *Attorney, Agent, or Firm* — Birch, Stewart, Kolasch & Birch, LLP

(57) ABSTRACT

For setting cooperation parameters of a communication system including a plurality of node devices interconnected by links and adapted to be respectively configured according to said cooperation parameters, a cooperation phase comprises: gathering measurements data representative of measurements of the random variables; optimizing the figure of merit for determining said cooperation parameters, on the basis of the obtained measurements. At least one link implying quantization operations relying on a codebook for gathering said measurements data and/or for providing said cooperation parameters, a pre-processing phase comprises beforehand: obtaining statistics data relative to a probability distribution of said random variables; and determining every
(Continued)

codebook on the basis of the figure of merit, such that the figure of merit is statistically optimized according to the obtained statistics.

14 Claims, 5 Drawing Sheets

(51) Int. Cl.
  *H04L 25/03* (2006.01)
  *H04B 7/024* (2017.01)
  *H04B 7/0413* (2017.01)
  *H04W 24/10* (2009.01)
(52) U.S. Cl.
  CPC ..... *H04B 7/0639* (2013.01); *H04L 25/03343* (2013.01); *H04L 25/03898* (2013.01); *H04L 25/03904* (2013.01); *H04W 24/10* (2013.01)
(58) Field of Classification Search
  CPC ............... H04B 7/0482; H04B 7/0639; H04L 25/03898; H04L 25/03904; H04L 25/03936; H04L 25/03942
  See application file for complete search history.

(56) References Cited

OTHER PUBLICATIONS

Li et al., "MSE-Based Robust Precoder Design in Multicell Downlink Systems", IEICE Trans. Fundamentals, vol. E96-A, No. 5, May 2013, pp. 1017-1020.

Marsch et al., "On Downlink Network MIMO under a Constrained Backhaul and Imperfect Channel Knowledge", IEEE "Globecom", 2009, pp. 1-6.

Zou et al., "A Closed-Loop Macro Diversity Scheme in Cooperative Multi-Point Downlink Transmission Systems", IEICE Trans. Commun., vol. E94-B, No. 9, Sep. 2011, pp. 2667-2671.

* cited by examiner

METHOD FOR SETTING COOPERATION PARAMETERS OF COMMUNICATION SYSTEM, COMPUTER PROGRAM THEREOF, INFORMATION STORAGE MEANS THEREOF, AND COMMUNICATION SYSTEM INCLUDING PLURALITY OF NODE DEVICES

TECHNICAL FIELD

The present invention generally relates to determining codebooks to be applied within a communication system in order to perform quantization operations when determining cooperation parameters having an impact on an environment of the communication system, wherein performance of the communication system is considered with regard to said environment.

Communication systems may rely on cooperation in order to improve performance of the communication systems with regard to an environment of said communication systems. According to one example, such cooperation can be found in a context of a virtual MIMO (Multiple-Input Multiple-Output) channel-based telecommunications network in which node devices, typically access points such as base stations or eNodeBs, cooperate in order to improve overall robustness of communications via the virtual MIMO channel. The virtual MIMO channel constitutes the environment of said telecommunications network, wherein each node device is adapted to be configured according to respective cooperation parameters having an impact on said environment. Said environment being represented by measurable random variables (transmission channel coefficients), each mobile terminal of the virtual MIMO channel-based telecommunications network is able to perform measurements of random variables representative of the virtual MIMO channel. According to another example, such cooperation can be found in a context of a temperature cooperative control system in a building, wherein several spaces of the building are equipped with a heater, a heater control device and a thermometer connected to the heater control device. The heat generated by the heater in one building space propagates to other building spaces, and reciprocally. The heater control devices and the thermometers can be interconnected by a communications network in order to cooperatively control the heaters. System performance is thus related to the temperature control in each room and to the energy consumption, and can be consequently expressed by a suitable figure of merit.

SUMMARY OF INVENTION

Technical Problem

However, communication links between node devices of the communication system (e.g. from the thermometers to their respective heater control devices and/or between the heater control devices) may have limited respective capacities and imply quantization operations relying on codebooks. Such quantization operations bring inaccuracy when attempting determining the parameters, referred to as the cooperation parameters, that are suitable for improving the communication system performance with regard to said environment.

Solution to Problem

It is desirable to overcome the aforementioned drawbacks of the prior art.

To that end, the present invention concerns a method for setting cooperation parameters of a communication system, the communication system including a plurality of node devices directly or indirectly interconnected by links, the node devices being adapted to be respectively configured according to said cooperation parameters, said cooperation parameters having an impact on an environment of the communication system, said environment being represented by measurable random variables, a figure of merit relative to performance of the communication system regarding said environment having to be optimized for determining said cooperation parameters. The method includes a cooperation phase comprising the following steps: gathering measurements data representative of measurements of the random variables performed at different locations within the communication system; determining said cooperation parameters such that said cooperation parameters lead to an optimized figure of merit relative to the performance of the communication system regarding said environment, on the basis of the obtained measurements; and providing said cooperation parameters, or information representative thereof, within the communication system. At least one link between node devices of the communication system implying quantization operations for gathering said measurements data and/or for providing said cooperation parameters or the information representative thereof, each quantization operation relying on implementing a codebook associated with the link on which said quantization operation applies, the method includes beforehand a pre-processing phase comprising the following steps: obtaining statistics data relative to a probability distribution of said random variables; and determining every codebook on the basis of the figure of merit and of the probability distribution of said random variables, such that the figure of merit is statistically optimized according to the obtained statistics. Thus, the performance of the communication system regarding said environment is improved, since the codebooks used for the quantization operations are statistically adapted in order to optimize the figure of merit.

According to a particular feature, when plural links imply such quantization operations, the pre-processing phase comprises jointly determining the codebooks associated with said links on the basis of the figure of merit, such that the figure of merit is statistically optimized according to the obtained statistics. Thus, improvement of the performance of the communication system regarding said environment is reinforced.

According to a particular feature, at least one parameters optimizing unit gathers said measurements data and determines accordingly said cooperation parameters or the information representative thereof, plural measurements data providing units are respectively located at said different locations for obtaining said measurements data and providing said measurements data to the parameters optimizing unit(s), plural parameters applying units respectively apply said cooperation parameters, and at least one quantization optimizing unit determines the codebook(s) to be applied during the cooperation phase and provides the determined codebook(s) to each parameters optimizing unit, and further to each measurements data providing units that have to perform quantization operations to transmit the respective measurements data and to each parameters applying unit that is intended to receive the respective cooperation parameters, or the information representative thereof, in quantized form. Thus, the communication system is structurally simple with regard to the definition and application of the codebooks.

According to a particular feature, the communication system comprises one parameters optimizing unit in each node device, wherein estimation $\tilde{h}^{(i)}$ of the random variables is obtained by the parameters optimizing unit for the respective parameters applying units, identified by an index i, as follows:

$$\tilde{h}^{(i)} = \sum_j \left(W_{j,i} CB_{j,i}(\hat{h}^{(j)})\right)$$

wherein $CB_{j,i}$ represents the quantization operations performed according to the respective codebooks $C_{j,i}$, the quantization operations $CB_{j,i}$ being herein performed onto the measurements data $\hat{h}^{(j)}$ respectively obtained by the measurements data providing units, identified by an index j, and transmitted in quantized form to each parameters optimizing unit, wherein $W_{j,i}$ are positive semi-definite weighting matrices such that:

$$\sum_j W_{j,i} = I$$

wherein I is an identity matrix, wherein the performance of the communication system regarding said environment is represented from the standpoint of each parameters optimizing unit by a figure of merit $\mathcal{F}$ representative of the mean-squared error between the estimation $\tilde{h}^{(i)}$ of the random variables and effective values of the random variables and that has to be minimized by said parameters optimizing unit in view of the measurements data gathered by said parameters optimizing unit, and wherein each quantization optimizing units determines the codebooks $C_{j,i}$ and the weighting matrices $W_{j,i}$ which statistically minimize the following expression for each parameters optimizing unit that said quantization optimizing units is in charge of configuring:

$$\mathbb{E}_{h,\{\hat{h}^{(j)}\}} \| h - \sum_j \left(W_{j,i} CB_{j,i}(\hat{h}^{(j)})\right) \|^2$$

wherein h represents the random variables and $\mathbb{E}_{h,\{\hat{h}^{(j)}\}}$ represents the mathematical expectation over the statistics of the random variable h and over the measurements data $\hat{h}^{(j)}$. Thus, the performance of the communication system regarding said environment can be independently improved by the node devices.

According to a particular feature, each quantization optimizing unit determines the codebooks $C_{j,i}$ and the weighting matrices $W_{j,i}$ which statistically minimize the following expression for each parameters optimizing unit that said quantization optimizing units is in charge of configuring:

$$\mathbb{E}_{h,\{\hat{h}^{(j)}\}} \| h - \sum_j \left(W_{j,i} CB_{j,i}(\hat{h}^{(j)})\right) \|^2 = \sum_j \operatorname{trace}\left(W_{j,i} Q_{z_{j,i}} W_{j,i}^\dagger\right)$$

wherein $Q_{z_{j,i}}$ represents an error covariance matrix of the measurements data transmitted in quantized form by the measurements data providing units and is expressed as follows:

$$Q_{z_{j,i}} = 2Q_j + C_h - \sum_{k=1}^{2^{R_{j,i}}} \alpha_{j,i,k} x_k^{(j,i)} x_k^{(j,i)H}$$

wherein $R_{j,i}$ represents a data rate for transmitting the measurements data from the measurements data providing units identified by the value of the index j to the parameters optimizing unit identified by the value of the index i, $C_h$ is a covariance matrix representative a probability distribution of the random variables h, and $Q_j$ represents an estimation error covariance matrix of the statistics relative to the measurements data obtained by the measurements data providing unit identified by the value of the index j, and wherein $x_k^{(j,i)}$ represents the k-th codeword from amongst codewords $x^{(j,i)}$ of the codebook $C_{j,i}$, and wherein $\alpha_{j,i,k}$ is a parameter representing a probability that the measurements data $\hat{h}^{(j)}$ belong to a Voronoi region associated to a centroid defined by the codeword $x_k^{(j,i)}$, and wherein each quantization optimizing units determines the codebooks $C_{j,i}$ and the weighting matrices $W_{j,i}$ by determining, by relying on semi-definite programming, intermediate matrices $B_{j,i}$ defined on the basis of the corresponding covariance matrices $Q_{z_{j,i}}$ according to the following system of equations:

$$\begin{cases} Q_{z_{j,i}} = Q_{C_{j,i}} + (I - (I+Q_j)^{-1})(I - (I+Q_j)^{-1})^H + \\ \qquad\quad (I - Q_j)^{-1} Q_j (I+Q_j)^{-H} \\ Q_{C_{j,i}} = 2 N^{1/n} \beta\, 2\pi\left(\dfrac{n+1}{n}\right)^{n+1} B_{j,i}^{-1} \\ \det(\Phi) = 1 \\ \Phi = \dfrac{1}{2} \begin{bmatrix} \mathcal{R}\left(B_{j,i}^{1/2}(I+Q_j)^{-1} B_{j,i}^{H/2}\right) & \mathcal{I}\left(B_{j,i}^{1/2}(I+Q_j)^{-1} B_{j,i}^{H/2}\right) \\ \mathcal{I}\left(B_{j,i}^{1/2}(I+Q_j)^{-1} B_{j,i}^{H/2}\right) & \mathcal{R}\left(B_{j,i}^{1/2}(I+Q_j)^{-1} B_{j,i}^{H/2}\right) \end{bmatrix} \end{cases}$$

wherein $Q_{C_{j,i}}$ is a quantization error covariance matrix relative to the codebook $C_{j,i}$, N represents the cardinality $|C_{j,i}|$ of the codebook $C_{j,i}$, $\beta$ represents a scalar and n represents the cardinality of the random variables h. Thus, quantization optimization being performed on the intermediate matrices $B_{j,i}$, determining the codebooks to be applied is simplified.

According to a particular feature, the communication system comprises one quantization optimizing unit in each node device, said quantization optimizing unit being in charge of configuring the parameters optimizing unit of said node device. Thus, quantization optimization and cooperation parameters optimization can be distributed over the node devices.

According to a particular feature, the communication system comprises one quantization optimizing unit in a server interconnected with each node device or in a master node device among said node devices, said quantization optimizing unit being in charge of configuring the parameters optimizing units. Thus, quantization optimization can be performed in a single device or equipment, and thus computational needs can be concentrated in said single device or equipment, although cooperation parameters optimization is performed in a distributed fashion over the node devices.

According to a particular feature, the communication system comprises one parameters optimizing unit and one quantization optimizing unit in a server interconnected with each node device or in a master node device among said node devices, wherein estimation $\tilde{h}^{(0)}$ of the random variables is obtained by the parameters optimizing unit, identified by the index value "0", for each parameters applying unit as follows:

$$\tilde{h}^{(0)} = \sum_j \left(W_{j,0} CB_{j,0}(\hat{h}^{(j)})\right)$$

wherein $CB_{j,0}$ represents the quantization operations performed according to the respective codebooks $C_{j,0}$, the quantization operations $CB_{j,0}$ being herein performed onto the measurements data $\hat{h}^{(j)}$ respectively obtained by the measurements data providing units, identified by an index j, and transmitted in quantized form to the parameters optimizing unit, identified by an index j, wherein $W_{j,0}$ are positive semi-definite weighting matrices such that:

$$\sum_j W_{j,0} = I$$

wherein I is an identity matrix, wherein the performance of the communication system regarding said environment is represented by a figure of merit $\mathcal{F}$ representative of the mean-squared error between the estimation $\tilde{h}^{(0)}$ of the random variables and effective values of the random variables and that has to be minimized by the parameters optimizing unit in view of the measurements data gathered by the parameters optimizing unit, and wherein the quantization optimizing unit determines the codebooks $C_{j,0}$ and the weighting matrices $W_{j,0}$ which statistically minimize the following expression:

$$\mathbb{E}_{h,\{\hat{h}^{(j)}\}} \| h - \sum_j \left(W_{j,0} CB_{j,0}(\hat{h}^{(j)})\right) \|^2$$

wherein h represents the random variables and $\mathbb{E}_{h,\{\hat{h}^{(j)}\}}$ represents the mathematical expectation over the statistics of the random variable h and over the measurements data $\hat{h}^{(j)}$. Thus, quantization optimization and cooperation parameters optimization can be performed in a centralized fashion, and the communication system performance regarding said environment can be improved although said quantization operations are needed to gather measurements data of the random variables.

According to a particular feature, the quantization optimizing unit determines the codebooks $C_{j,0}$ and the weighting matrices $W_{j,0}$ which statistically minimize the following expression:

$$\mathbb{E}_{h,\{\hat{h}^{(j)}\}} \| h - \sum_j \left(W_{j,0} CB_{j,0}(\hat{h}^{(j)})\right) \|^2 = \sum_j \text{trace}\left(W_{j,0} Q_{z_{j,0}} W_{j,0}^\dagger\right)$$

wherein $Q_{z_{j,0}}$ represents an error covariance matrix of the measurements data transmitted in quantized form by the measurements data providing units and is expressed as follows:

$$Q_{z_{j,0}} = 2Q_j + C_h - \sum_{k=1}^{2^{R_{j,0}}} \alpha_{j,0,k} x_k^{(j,0)} x_k^{(j,0)H}$$

wherein $R_{j,0}$ represents a data rate for transmitting the measurements data from the measurements data providing units identified by the value of the index j to the parameters optimizing unit, $C_h$ represents a covariance matrix representative a probability distribution of the random variables h, and $Q_j$ represents an estimation error covariance matrix of the statistics relative to the measurements data obtained by the measurements data providing unit identified by the value of the index j, and wherein $x_k^{(j,0)}$ represents the k-th codeword from amongst codewords $x^{(j,0)}$ of the codebook $C_{j,0}$, and wherein $\alpha_{j,0,k}$ is a parameter representing a probability that the measurements data $\hat{h}^{(j)}$ belong to a Voronoi region associated to a centroid defined by the codeword $x_k^{(j,0)}$, and wherein the quantization optimizing unit determines the codebooks $C_{j,0}$ and the weighting matrices $W_{j,0}$ by determining, by relying on semi-definite programming, intermediate matrices $B_{j,0}$ defined on the basis of the corresponding covariance matrices $Q_{z_{j,0}}$ according to the following system of equations:

$$\begin{cases} Q_{z_{j,i}} = Q_{C_{j,i}} + (I - (I+Q_j)^{-1})(I - (I+Q_j)^{-1})^H + \\ \qquad\qquad (I-Q_j)^{-1} Q_j (I+Q_j)^{-H} \\ Q_{C_{j,i}} = 2\, N^{1/n} \beta\, 2\pi \left(\frac{n+1}{n}\right)^{n+1} B_{j,i}^{-1} \\ \det(\Phi) = 1 \\ \Phi = \frac{1}{2} \begin{bmatrix} \mathcal{R}\left(B_{j,i}^{1/2}(I+Q_j)^{-1} B_{j,i}^{H/2}\right) & \mathfrak{I}\left(B_{j,i}^{1/2}(I+Q_j)^{-1} B_{j,i}^{H/2}\right) \\ \mathfrak{I}\left(B_{j,i}^{1/2}(I+Q_j)^{-1} B_{j,i}^{H/2}\right) & \mathcal{R}\left(B_{j,i}^{1/2}(I+Q_j)^{-1} B_{j,i}^{H/2}\right) \end{bmatrix} \end{cases}$$

wherein $Q_{C_{j,0}}$ is a quantization error covariance matrix relative to the codebook $C_{j,0}$, N' represents the cardinality of the codebook $C_{j,0}$, $\beta'$ represents a scalar, and n represents the cardinality of the random variables h. Thus, quantization optimization is simplified.

According to a particular feature, the communication system comprises one parameters optimizing unit and one quantization optimizing unit in a server interconnected with each node device or in a master node device among said node devices, wherein estimation of the random variables is obtained by the parameters optimizing unit, identified by the index value "0", on behalf of each parameters applying unit, identified by the index i, as follows:

$$\tilde{h}^{(i)} = \sum_j \left(W_{j,0}^{(i)} z_{j,0}\right) = \sum_j \left(W_{j,0}^{(i)} CB_{j,0}(\hat{h}^{(j)})\right)$$

wherein $CB_{j,0}$ represents the quantization operations performed according to the respective codebooks $C_{j,0}$, the quantization operations $CB_{j,0}$ being herein performed onto the measurements data $\hat{h}^{(j)}$ respectively obtained by the measurements data providing units, identified by an index j, and transmitted in quantized form to the parameters optimizing unit, and wherein $W_{j,0}^{(i)}$ are positive semi-definite weighting matrices determined by the quantization optimizing unit for said parameters applying unit identified by the index i such that:

$$\sum_j W_{j,0}^{(i)} = I$$

wherein I is an identity matrix, wherein the performance of the communication system regarding said environment is represented from the standpoint of the parameters optimizing unit for each parameters applying unit, identified by the index i, by a figure of merit $\mathcal{F}$ representative of the mean-squared error between the estimation $\tilde{h}^{(i)}$ of the random variables and effective values of the random variables and that has to be minimized by said parameters optimizing unit in view of the measurements data gathered by said parameters optimizing unit, and wherein the quantization optimizing unit determines the codebooks the weighting matrices $W_{j,0}^{(i)}$ and the codebooks $C_{i,0}$, which statistically minimize the following expression:

$$\max_i \left( \mathbb{E}_{h, \{\hat{h}^{(j)}\}} \| h - CB_{0,i} \left( \sum_j (W_{j,0}^{(i)} CB_{j,0}(\hat{h}^{(j)})) \right) \|^2 \right)$$

wherein h represents the random variables and $\mathbb{E}_{h,\{\hat{h}^{(j)}\}}$ represents the mathematical expectation over the statistics of the random variable h and over the measurements data $\hat{h}^{(j)}$. Thus, quantization optimization and cooperation parameters optimization can be performed in a centralized fashion, and the communication system performance regarding said environment can be improved although said quantization operations are needed to gather measurements data of the random variables and to provide estimations of the random variables within the communication system.

According to a particular feature, the random variables are coefficients of a virtual MIMO channel between the node devices acting as access points for mobile terminals with which the virtual MIMO channel is set up.

According to a particular feature, the communication system comprises one parameters optimizing unit and one quantization optimizing unit in a server interconnected with each node device or in a master node device among said node devices, the random variables being coefficients of a virtual MIMO channel between the node devices acting as access points for mobile terminals with which the virtual MIMO channel is set up, the cooperation parameters being precoding matrices applied by the node devices for transmitting symbols $S_j$ to the mobile terminals, identified by an index j, via respective transmission channels $H'_j$, one measurements data providing units being defined per mobile terminal, each mobile terminal being equipped with a Minimum Mean Square Error receive filter $T_j$ defined as follows:

$$T_j^H = \delta_j^H P^H H'_j{}^H (H'_j P P^H H'_j{}^H + I)^{-1}$$

wherein $\delta_j$ is a selection matrix isolating data addressed to the mobile terminal identified by the value of the index j such that $\delta_j S = S_j$, wherein S is a concatenation of the symbols $S_j$ respectively addressed to the mobile terminals, identified by the index j, and simultaneously transmitted after precoding by the node devices, wherein the performance of the communication system regarding said environment is represented by the figure of merit $\mathcal{F}$ that is representative of a sum rate of the virtual MIMO channel and that has to be maximized by said parameters optimizing unit in view of the measurements data gathered by said parameters optimizing unit:

$$\mathcal{F}(P) = \max_P \left( \sum_{j=1}^{J} \log \det \left( (\delta_j^H (P^H H'_j{}^H H'_j P + I)^{-1} \delta_j)^{-1} \right) \right)$$

wherein P is a concatenation of the precoding matrices, wherein the quantization optimizing unit determines codebooks $C_{j,0}$ and codebooks $C_{0,i}$ such that the following expression is maximized with regard to the concatenation P of the precoding matrices:

$$\mathbb{E}_{\{\widehat{H'_j}\}} \| \max_P \sum_{j=1}^{J} \log \det \left( (\delta_j^H (P^H (CM_{j,0}(\widehat{H'_j}))^H CM_{j,0}(\widehat{H'_j}) P + I)^{-1} \delta_j)^{-1} \right) \|$$

wherein P is such that each precoding matrices respectively belong to the codebook $C_{0,i}$, and wherein $\mathbb{E}_{\{\widehat{H'_j}\}}$ represents the mathematical expectation over the statistics of measurements data $\widehat{H'_j}$ for the respective transmission channel represented by $H'_j$, and wherein $CM_{j,0}$ represents the quantization operation according to the codebook $C_{j,0}$. Thus, quantization optimization and cooperation parameters optimization can be performed in a centralized fashion, and the communication system performance regarding said environment can be improved although said quantization operations are needed to gather measurements data of the random variables and to provide the precoding matrices within the communication system.

The present invention also concerns a communication system including a plurality of node devices directly or indirectly interconnected by links, the node devices being adapted to be respectively configured according to cooperation parameters having an impact on an environment of the communication system, said environment being represented by measurable random variables, a figure of merit relative to performance of the communication system regarding said environment having to be optimized for determining said cooperation parameters, characterised in that the communication system implements for performing a cooperation phase: means for gathering measurements data representative of measurements of the random variables performed at different locations within the communication system; means for determining said cooperation parameters such that said cooperation parameters lead to an optimized figure of merit relative to the performance of the communication system regarding said environment, on the basis of the obtained measurements; and means for providing said cooperation parameters, or information representative thereof, within the communication system. At least one link between node devices of the communication system implying quantization operations for gathering said measurements data and/or for providing said cooperation parameters or the information representative thereof, each quantization operation relying on implementing a codebook associated with the link on which said quantization operation applies, the communication system implements, for performing beforehand a pre-processing phase: means for obtaining statistics data relative to a probability distribution of said random variables; and means for determining every codebook on the basis of the figure of merit and of the probability distribution of said random variables, such that the figure of merit is statistically optimized according to the obtained statistics.

The present invention also concerns a computer program that can be downloaded from a communications network and/or stored on a medium that can be read by a computer or processing device. This computer program comprises instructions for causing implementation of the aforementioned method, when said program is run by a processor. The present invention also concerns information storage means, storing a computer program comprising a set of instructions causing implementation of the aforementioned method, when the stored information is read from said information storage means and run by a processor.

Since the features and advantages related to the communication system and to the computer program are identical to those already mentioned with regard to the corresponding aforementioned method, they are not repeated here. The characteristics of the invention will emerge more clearly from a reading of the following description of an example of embodiment, said description being produced with reference to the accompanying drawings.

DESCRIPTION OF EMBODIMENTS

Figure 1A:
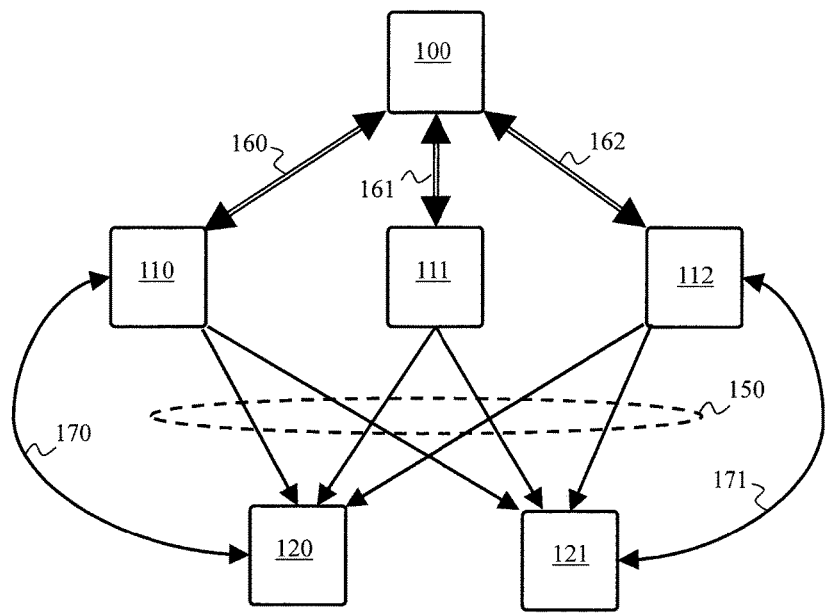
FIG. 1A schematically represents a first communication system in which the present invention may be implemented.

The present invention is detailed hereafter in a context of a virtual MIMO channel-based telecommunications network in which node devices, typically access points such as base stations or eNodeBs, cooperate in order to improve overall robustness of communications via the virtual MIMO channel. The virtual MIMO channel constitutes an environment of said telecommunications network, wherein each node device is adapted to be configured according to respective cooperation parameters having an impact on said environment. Said environment being represented by measurable random variables, each mobile terminal of the virtual MIMO channel-based telecommunications network is able to perform measurements of random variables representative of the virtual MIMO channel. Similarly, the node devices are able to perform said measurements, when considering that transmission channels are substantially symmetrical. The cooperation parameters are updated according to said measurements, in order to take into account variations of the environment, i.e. variations of transmission conditions.

At least one link between node devices implies performing quantization operations for transmitting data representative of said measurements and/or for transmitting said cooperation parameters. Such quantization operations rely on codebooks respectively associated with the concerned links. To improve the performance of the virtual MIMO channel-based telecommunications network, it is proposed to define every codebook by taking into account a figure of merit that has to be optimized in order to define said cooperation parameters, as well as statistics data relative to a probability distribution of the random variables. By defining that way every codebook, impact of the quantization operations on the effective performance of the virtual MIMO channel-based telecommunications network as obtained by applying said cooperation parameters is limited.

The principles described herein however apply to a broader scope of communication system applications, as far as a plurality of node devices perform cooperation to improve performance of the communication system with regard to an environment of said communication system, on the basis of measurements of random variables representing said environment, and as far as at least one link between said node devices implies performing quantization operations for transmitting data representative of said measurements and/or for transmitting cooperation parameters used to configure the communications system in the scope of the cooperation.

According to one example, the principles described herein apply to a temperature cooperative control system in a building, wherein several spaces of the building are equipped with a heater, a heater control device and a thermometer connected to the heater control device. The heat generated by the heater in one building space propagates to other building spaces, and reciprocally. System performance is related to the temperature control in each room and to the energy consumption, and can be consequently expressed by a suitable figure of merit. The heater control devices and the thermometers can be interconnected in order to cooperatively control the heaters. Communication links from the thermometers to their respective heater control devices and/or communication links between the heater control devices may have limited respective capacities and thus imply quantization operations. Heat propagation from one building space to another may be defined in terms of statistics data relative to a probability distribution of random variables. Every codebook used for the quantization operations can therefore be defined, according to the present invention, by taking into account said figure of merit, which has to be optimized, and said statistics data.

Communication links having limited capacity refers herein to communication links that enable transmitting only a given amount of information in a given amount of time within which said information shall be available for further processing at reception in order to be able to achieve a predefined targeted reactivity level (i.e. latency issue in view of the given amount of information).

FIG. 1A schematically represents a first communication system in which the present invention may be implemented.

The first communication system comprises: a server 100; a plurality of access points 110, 111, 112; and a plurality of mobile terminals 120, 121 communicating via the access points 110, 111, 112. The mobile terminals 120, 121 are adapted to simultaneously receive signals from plural access points. As shown in FIG. 1A, although the mobile terminal 120 preferably communicates with the access point 110 (as shown by an arrow 170), the mobile terminal 120 also receives signals from the access points 111 and 112, and, although the mobile terminal 121 preferably communicates with the access point 112 (as shown by an arrow 171), the mobile terminal 121 also receives signals from the access points 110 and 111.

Each access point 110, 111, 112 of the first communication system is connected to the server 100. In FIG. 1A, the access point 110 is connected to the server 100 via a bidirectional link 160, the access point 111 is connected to the server 100 via a bidirectional link 161 and the access point 112 is connected to the server 100 via a bidirectional link 162. The bidirectional links 160, 161 and 162 have limited capacities, in such a way that at least some data transmitted by the access points 110, 111, 112 to the server 100 have to be quantized and/or at least some data transmitted by the server 100 to the access points 110, 111, 112 have to be quantized. Only one bidirectional link 160, 161, 162 may have limited capacity. The limited capacity may also concern only one direction of any bidirectional link 160, 161, 162. Such limited capacity implies quantization operations that have to be performed by relying on respective codebooks.

In order to implement a virtual MIMO channel 150 such that the mobile terminals 120, 121 can benefit from the ability to simultaneously receive signals from plural access points, the access points 110, 111, 112 of the first communication system implement a cooperation phase. The cooperation phase aims at determining cooperation parameters for configuring the access points 110, 111, 112 in order to attempt improving communications performance via the virtual MIMO channel 150. Such improvement is targeted by optimizing a figure of merit representative of the performance of the first communication system with regard to the virtual MIMO channel 150. The virtual MIMO channel 150 can be represented by random variables (channel coefficients) which can be measured by the mobile terminals 120, 121, and/or by the access points 110, 111, 112. When measurements of said random variables are performed by the mobile terminals 120, 121, said mobile terminals 120, 121 transmit information representative of said measurements to at least one access point. Communicating the information representative of said measurements from the mobile terminals 120, 121 to the access points 110, 111, 112 may require quantization operations that have to be performed by relying on respective codebooks.

From said measurements, the first communication system is able to optimize the figure of merit representative of the performance of the first communication system with regard to the virtual MIMO channel in order to determine the cooperation parameters to be applied by the access points 110, 111, 112 in order to attempt improving said performance.

In the scope of the first communication system shown in FIG. 1A, the server 100 is in charge of determining said cooperation parameters from the information representative of said measurements, and thus is in charge of optimizing the figure of merit representative of the performance of the first communication system with regard to the virtual MIMO channel. When measurements performed by the mobile terminals 120, 121, the information representative of the measurements is provided by the concerned mobile terminal via one or more access points.

From what precedes, it can be understood that quantization operations may have to be applied on said information representative of the measurements to enable the server 100 to receive estimates of said information and/or on said cooperation parameters to enable one or more access points to receive estimates of said cooperation parameters.

Such quantization operations imply that the cooperation parameters effectively applied by the access points 110, 111, 112 might not allow reaching the performance of the first communication system with regard to the virtual MIMO channel which could be reached in view of the measurements made and of said figure of merit. Therefore, in order to limit the impact of the quantization operations on said performance, the server 100 is adapted to implement beforehand a pre-processing phase. In said pre-processing phase, the server 100 obtains statistics data relative to a probability distribution of said random variables measured by the mobile terminals 120, 121 and/or by the access points 110, 111, 112. Furthermore, the server 100 determines every codebook used for said quantization operations on the basis of said figure of merit, such that the figure of merit is statistically optimized according to said statistics data. In this way, every codebook is defined in such a way that the quantization operations have a limited impact on the effective performance of the first communication system with regard to the virtual MIMO channel.

Figure 1B:
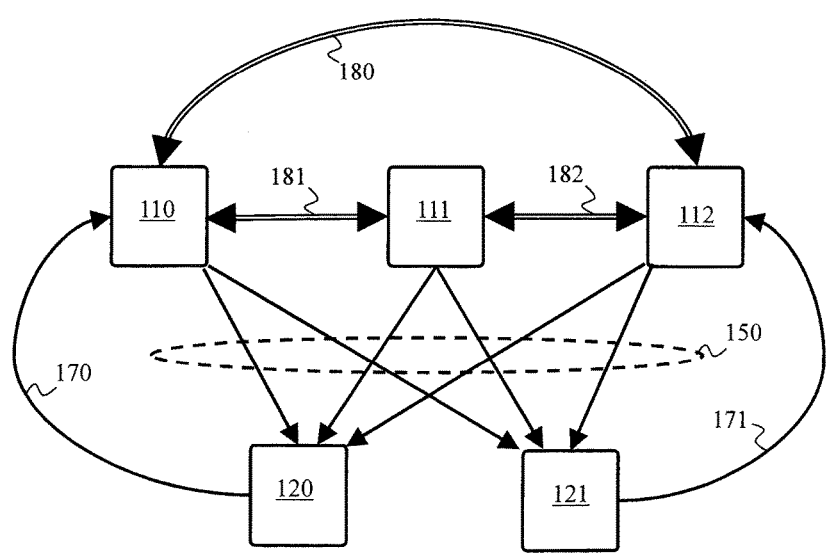
FIG. 1B schematically represents a second communication system in which the present invention may be implemented.

FIG. 1B schematically represents a second communication system in which the present invention may be implemented.

The second communication system comprises: the plurality of access points 110, 111, 112; and the plurality of mobile terminals 120, 121. Compared with the first communication system shown in FIG. 1A, the second communication system shown in FIG. 1B does not comprise the server 100. The mobile terminals 120, 121 are, here again, adapted to simultaneously receive signals from plural access points. As shown in FIG. 1B, although the mobile terminal 120 preferably communicates with the access point 110 (as shown by the arrow 170), the mobile terminal 120 also receives signals from the access points 111 and 112, and, although the mobile terminal 121 preferably communicates with the access point 112 (as shown by the arrow 171), the mobile terminal 121 also receives signals from the access points 110 and 111.

The access point 110, 111, 112 of the second communication system are interconnected. In FIG. 1B, the access point 110 is connected to the access point 111 via a bidirectional link 181, the access point 111 is connected to the access point 112 via a bidirectional link 182 and the access point 112 is connected to the access point 110 via a bidirectional link 180. The bidirectional links 180, 181 and 182 have limited capacities, in such a way that at least some data between the access points 110, 111, 112 have to be quantized. Only one bidirectional link 180, 181, 182 may have limited capacity. The limited capacity may also concern only one direction of any bidirectional link 180, 181, 182. Such limited capacity implies quantization operations that have to be performed by relying on a codebook.

In order to implement the virtual MIMO channel 150 such that the mobile terminals 120, 121 can benefit from the ability to simultaneously receive signals from plural access points, the access points 110, 111, 112 of the second communication system implement the cooperation phase. As already mentioned, the cooperation phase aims at determining cooperation parameters for configuring the access points 110, 111, 112 in order to attempt improving communications performance via the virtual MIMO channel 150. Such improvement is targeted by optimizing the figure of merit representative of the performance of the second communication system with regard to the virtual MIMO channel 150. As already mentioned, the virtual MIMO channel 150 can be represented by random variables which can be measured by the mobile terminals 120, 121 and/or by the access points 110, 111, 112. When measurements of said random variables are performed by the mobile terminals 120, 121, said mobile terminals 120, 121 transmit information representative of said measurements to at least one access point. Communicating the information representative of said measurements from the mobile terminals 120, 121 to the access points 110, 111, 112 may require quantization operations.

From said measurements, the second communication system is able to optimize the figure of merit representative of the performance of the second communication system with regard to the virtual MIMO channel in order to determine the cooperation parameters to be applied by the access points 110, 111, 112 in order to attempt improving said performance.

In the scope of the second communication system shown in FIG. 1B, one access point among the access points 110, 111, 112 is in charge of determining said cooperation parameters from the information representative of said measurements, and thus is in charge of optimizing the figure of merit representative of the performance of the second communication system with regard to the virtual MIMO channel.

Another approach is that all the access points 110, 111, 112 are in charge of determining their own cooperation parameters from the information representative of said measurements. All the access points 110, 111, 112 thus optimize in parallel the figure of merit representative of the performance of the second communication system with regard to the virtual MIMO channel.

From what precedes, it can be understood that quantization operations may have to be applied on said information representative of the measurements to enable one or more access points to receive estimates of said information and/or on said cooperation parameters to enable one or more access points to receive estimates of said cooperation parameters.

Such quantization operations imply that the cooperation parameters effectively applied by the access points 110, 111, 112 might not allow reaching the performance of the second communication system with regard to the virtual MIMO channel performance which could be reached in view of the measurements made and of said figure of merit. Therefore, in order to limit the impact of the quantization operations on said performance, at least one access point is adapted to implement beforehand the pre-processing phase. In said pre-processing phase, said access point obtains statistics data relative to a probability distribution of said random variables measured by the mobile terminals 120, 121 and/or by the access points 110, 111, 112. Furthermore, said access point determines every codebook used for said quantization operations on the basis of said figure of merit, such that the figure of merit is statistically optimized according to said statistics data. In this way, every codebook is defined in such a way that the quantization operations have a limited impact on the effective performance of the second communication system with regard to the virtual MIMO channel. It can be noted that the second communication system may be such that every access point performs the pre-processing phase in order to determine the cooperation parameters to be applied by said access point.

Figure 1C:
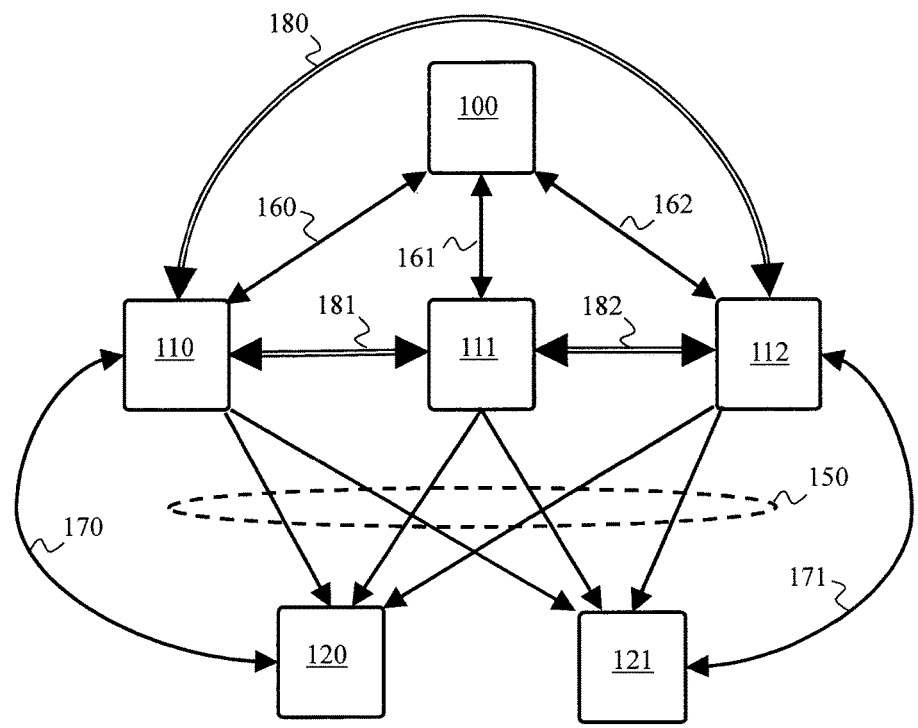
FIG. 1C schematically represents a third communication system in which the present invention may be implemented.

FIG. 1C schematically represents a third communication system in which the present invention may be implemented.

The third communication system comprises: the server 100; the plurality of access points 110, 111, 112; and the plurality of mobile terminals 120, 121. The mobile terminals 120, 121 are, here again, adapted to simultaneously receive signals from plural access points. As shown in FIG. 1C, although the mobile terminal 120 preferably communicates with the access point 110 (as shown by the arrow 170), the mobile terminal 120 receives also signals from the access points 111 and 112, and, although the mobile terminal 121 preferably communicates with the access point 112 (as shown by the arrow 171), the mobile terminal 121 also receives signals from the access points 110 and 111.

The access points 110, 111, 112 of the third communication system are interconnected. In FIG. 1C, the access point 110 is connected to the access point 111 via the bidirectional link 181, the access point 111 is connected to the access point 112 via the bidirectional link 182 and the access point 112 is connected to the access point 110 via the bidirectional link 180. The bidirectional links 180, 181 and 182 have limited capacities, in such a way that at least some data between the access points 110, 111, 112 have to be quantized. Only one bidirectional link 180, 181, 182 may have limited capacity. The limited capacity may also concern only one direction of any bidirectional link 180, 181, 182. Such limited capacity implies quantization operations that have to be performed by relying on respective codebooks.

Each access point 110, 111, 112 of the third communication system is further connected to the server 100. In FIG. 1C, the access point 110 is connected to the server 100 via the bidirectional link 160, the access point 111 is connected to the server 100 via the bidirectional link 161 and the access point 112 is connected to the server 100 via the bidirectional link 162.

In order to implement the virtual MIMO channel 150 such that the mobile terminals 120, 121 can benefit from the ability to simultaneously receive signals from plural access points, the access points 110, 111, 112 of the third communication system implement the cooperation phase. As already mentioned, the cooperation phase aims at determining cooperation parameters for configuring the access points 110, 111, 112 in order to attempt improving communications performance via the virtual MIMO channel 150. Such improvement is targeted by optimizing the figure of merit representative of the performance of the third communication system with regard to the virtual MIMO channel 150. As already mentioned, the virtual MIMO channel 150 can be represented by random variables which can be measured by the mobile terminals 120, 121 and/or by the access points 110, 111, 112. When measurements of said random variables are performed by the mobile terminals 120, 121, said mobile terminals 120, 121 transmit information representative of said measurements to at least one access point. Communicating the information representative of said measurements from the mobile terminals 120, 121 to the access points 110, 111, 112 may require quantization operations.

From said measurements, the third communication system is able to optimize the figure of merit representative of the performance of the third communication system with regard to the virtual MIMO channel in order to determine the cooperation parameters to be applied by the access points 110, 111, 112 in order to attempt improving said performance.

In the scope of the third communication system shown in FIG. 1C, one access point among the access points 110, 111, 112 is in charge of determining said cooperation parameters from the information representative of said measurements, and thus is in charge of optimizing the figure of merit representative of the performance of the third communication system with regard to the virtual MIMO channel.

Another approach is that all the access points 110, 111, 112 are in charge of determining their own cooperation parameters from the information representative of said measurements. All the access points 110, 111, 112 thus optimize in parallel the figure of merit representative of the virtual MIMO channel performance.

From what precedes, it can be understood that quantization operations may have to be applied on said information representative of the measurements to enable one or more access points to receive an estimate of said information and/or on said cooperation parameters to enable one or more access points to receive an estimate of said cooperation parameters.

Such quantization operations imply that the cooperation parameters effectively applied by the access points 110, 111, 112 might not allow reaching the performance of the third communication system with regard to the virtual MIMO channel which could be reached in view of the measurements made and of said figure of merit. Therefore, in order to limit the impact of the quantization operations on said performance, the server 100 is adapted to implement beforehand the pre-processing phase. In said pre-processing phase, the server 100 obtains statistics data relative to a probability distribution of said random variables measured by the mobile terminals 120, 121 and/or by the access points 110, 111, 112. Furthermore, the server 100 determines every codebook used for said quantization operations on the basis of said figure of merit, such that the figure of merit is statistically optimized according to said statistics data. In this way, every codebook is defined in such a way that every quantization operations have a limited impact on the effective performance of the third communication system with regard to the virtual MIMO channel.

It can be noticed that, in FIGS. 1A, 1B and 1C, the access point 110, 111, 112 are interconnected either directly or indirectly (via the server 100) with each other.

Figure 2:
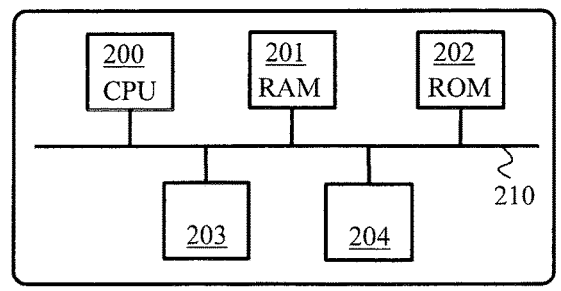
FIG. 2 schematically represents an example of hardware architecture of an access point and/or of a server, as used in the first communication system or in the second communication system or in the third communication system.

FIG. 2 schematically represents an example of hardware architecture of any access point and/or of the server 100, as used in the first communication system or in the second communication system or in the third communication system. Let's illustratively consider that FIG. 2 represents an example of hardware architecture of the server 100.

According to the shown architecture, the server 100 comprises the following components interconnected by a communications bus 210: a processor, microprocessor, microcontroller or CPU (Central Processing Unit) 200; a RAM (Random Access Memory) 201; a ROM (Read-Only Memory) 202; an SD (Secure Digital) card reader 203, or any other device adapted to read information stored on storage means; and a set of communication interfaces 204.

The set of communication interfaces 204 enables the server 100 to communicate within the first communication system or within the third communication system. When considering that the example of hardware architecture shown in FIG. 2 represents an access point, the set of communication interfaces 204 enables said access point to communicate within the first communication system or within the second communication system or within the third communication system.

CPU 200 is capable of executing instructions loaded into RAM 201 from ROM 202 or from an external memory, such as an SD card. After the server 100 has been powered on, CPU 200 is capable of reading instructions from RAM 201 and executing these instructions. The instructions form one computer program that causes CPU 200 to perform some or all of the steps of the algorithms described hereafter and/or to implement any one of the modular architectures described hereafter with regard to FIGS. 3A to 3C.

Figure 3A:
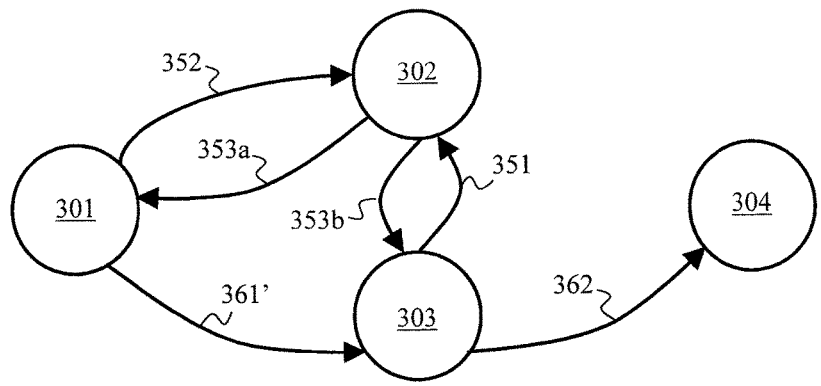
FIG. 3A schematically represents a first modular arrangement for implementing the present invention.
Figure 3B:
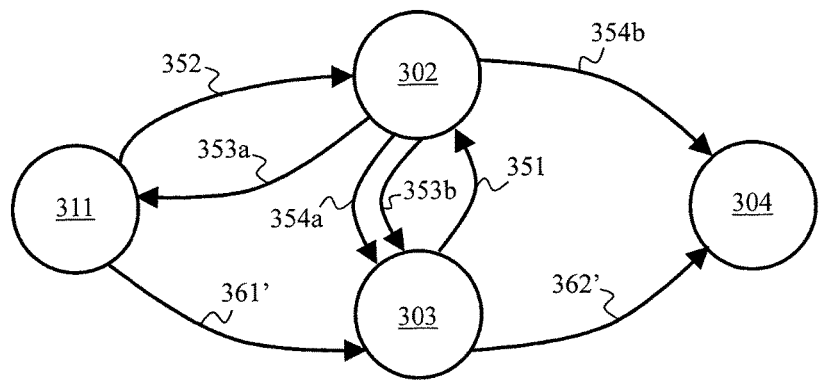
FIG. 3B schematically represents a second modular arrangement for implementing the present invention.
Figure 3C:
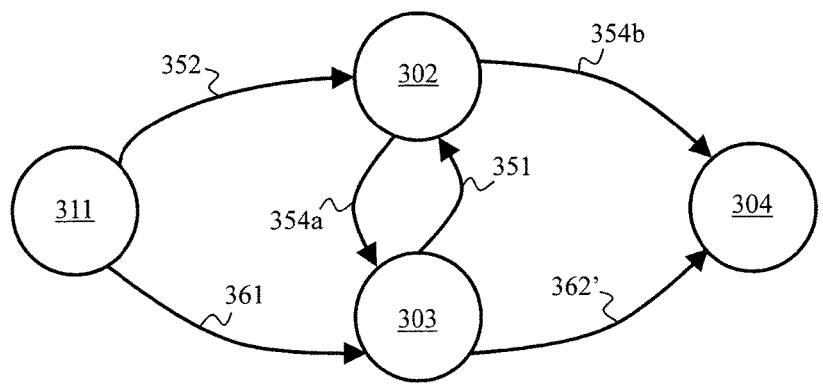
FIG. 3C schematically represents a third modular arrangement for implementing the present invention.

Any and all steps of the algorithms described hereafter and/or the modular architectures described hereafter with regard to FIGS. 3A to 3C may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3A schematically represents a first modular arrangement for implementing the present invention.

Four kinds of functionality emerge from what has been described with regard to FIGS. 1A to 1C, namely: a measurements data providing functionality, for providing measurements data in order to optimize the figure of merit relative to the communication system performance with regard to the virtual MIMO channel 150; a parameters optimizing functionality, for determining the cooperation parameters of the access points by optimizing said figure of merit; a parameter applying functionality, for applying the cooperation parameters obtained by optimizing said figure of merit; and a quantization optimizing functionality, for defining every codebook used for quantizing data in the scope of the cooperation.

Said functionalities are preferably implemented by dedicated units, respectively: a measurements data providing unit 301; a parameters optimizing unit 303; a parameters applying unit 304; and a quantization optimizing unit 302.

Plural measurements data providing units 301 are present in the communication systems shown in FIGS. 1A to 1C, one measurements data providing unit 301 in each access point 110, 111, 112 and/or in each mobile terminal 120, 121. Plural parameters applying units 304 are present in the communication systems shown in FIGS. 1A to 1C, one parameters applying unit 304 in each access point 110, 111, 112. One or more parameters optimizing units 303 are present in the communication systems shown in FIGS. 1A to 1C. One or more quantization optimizing units 302 are present in the communication systems shown in FIGS. 1A to 1C.

For what concerns the cooperation phase, each measurements data providing unit 301 is adapted to provide measurements data to at least one parameters optimizing unit 303, potentially in quantized form; each parameters optimizing unit 303 is adapted to provide cooperation parameters, or information representative thereof, to at least one parameters applying unit 304, potentially in quantized form. When measurements data to be transmitted from one measurements data providing unit 301 to one parameters optimizing unit 303 have to be quantized, one quantization optimizing unit 302 is adapted to provide a codebook to the measurements data providing unit 301 and to the parameters optimizing unit 303. When cooperation parameters, or information representative thereof, to be transmitted from one parameters optimizing unit 303 to one parameters applying unit 304 have to be quantized, one quantization optimizing unit 302 provides a codebook to the parameters optimizing unit 303 and to the parameters applying unit 304.

For what concerns the pre-processing phase, each measurements data providing unit 301 is adapted to provide statistics data relative to a probability distribution of said random variables to at least one quantization optimizing unit 302. In a variant, said statistics data may be obtained by said quantization optimizing unit 302 via a statistical model. At least one parameters optimizing unit 303 is adapted to provide information representative of the figure of merit to at least one quantization optimizing unit 302. In a variant, each quantization optimizing unit 302 knows the figure of merit beforehand, for instance by reading a dedicated register or memory zone in which a description of said figure of merit is previously stored during a configuration phase or during manufacturing.

The first modular arrangement comprises a plurality of measurements data providing units 301, only one of which being shown in FIG. 3A for simplicity considerations. The first modular arrangement further comprises a plurality of parameters applying units 304, only one of which being shown in FIG. 3A for simplicity considerations. The first modular arrangement further comprises one parameters optimizing unit 303, and one quantization optimizing unit 302. The first modular arrangement may comprise plural parameters optimizing units 303 and/or plural quantization optimizing units 302.

The first modular arrangement shows that the parameters optimizing unit 303 provides a description 351 of the figure of merit to the quantization optimizing unit 302. The first modular arrangement further shows that the quantization optimizing unit 302 receives, from each measurements data providing unit 301, statistics 352 relative to the probability distribution of the random variables to be further measured by the measurements data providing units 301 in the scope of the cooperation phase. The first modular arrangement further shows that the quantization optimizing unit 302 provides a first exemplar 353a of a codebook to each measurement data providing unit 301 having to perform quantization operations for transmitting measurements data to the parameters optimizing unit 303 and a second exemplar 353b of the codebook to the parameters optimizing unit 303 for receiving said measurements data from said measurement data providing unit 301. The first modular arrangement further shows that each measurement data providing unit 301 having to perform quantization operations for transmitting measurements data to the parameters optimizing unit 303 transmits quantized measurements data 361' to the parameters optimizing unit 303. Each measurement data providing unit 301 that does not have to perform quantization operations for transmitting measurements data to the parameters optimizing unit 303 transmits non-quantized measurements data to the parameters optimizing unit 303 (not shown in FIG. 3A). The first modular arrangement further shows that the parameters optimizing unit 303 transmits non-quantized cooperation parameters 362 resulting from the optimization of the figure of merit to each parameters applying unit 304.

It can be understood that the first modular arrangement matches, among others, the architecture of the third communication system shown in FIG. 1C as follows: one measurements data providing unit 301 is located in each access point 110, 111, 112 for providing to the server 100 the random variables statistics in the pre-processing phase, and for providing to the other access points measurements data in the cooperation phase; one parameters applying unit 304 is located in each access point 110, 111, 112 for applying the cooperation parameters resulting from an optimization of the figure of merit; one parameters optimizing unit 303 is located in each access point 110, 111, 112 for determining the cooperation parameters to be applied by said access point in the scope of the cooperation; and one quantization optimizing unit 302 is located in the server 100 to determine, in the pre-processing phase, the codebooks to be applied. The measurements data providing unit 301 are therefore adapted to transmit measurements data to each parameters optimizing unit 303. When no mobile terminal is attached to an access point, it is considered that the measurements data to be provided to the server 100 are empty and that any quantization operation for said measurements data is use-less. It can also be considered that the measurements data providing units 301 are located in the mobile terminals 120, 121. Therefore, in view of what precedes, the third communication system is, in this case, such that at least one link among the links from the mobile terminals 120, 121 to the access points 110, 112 via which said mobile terminals 120, 121 communicate measurements data implies quantization operations and/or at least one link among the links between the access points 110, 111, 112, via which said mobile terminals 120, 121 communicate measurements data, implies quantization operations.

FIG. 3B schematically represents a second modular arrangement for implementing the present invention.

The second modular arrangement comprises a plurality of measurements data providing units 301, only one of which being shown in FIG. 3B for simplicity considerations. The second modular arrangement further comprises a plurality of parameters applying units 304, only one of which being shown in FIG. 3B for simplicity considerations. The second modular arrangement further comprises one parameters optimizing unit 303, and one quantization optimizing unit 302. The second modular arrangement may comprise plural parameters optimizing unit 303 and/or plural quantization optimizing unit 302.

The second modular arrangement shows that the parameters optimizing unit 303 provides a description 351 of the figure of merit to the quantization optimizing unit 302. The second modular arrangement further shows that the quantization optimizing unit 302 receives from each measurements data providing unit 301 statistics 352 relative to the probability distribution of the random variables to be further measured by the measurements data providing units 301 in the scope of the cooperation phase. The second modular arrangement further shows that the quantization optimizing unit 302 provides a first exemplar 353a of a first codebook to each measurement data providing unit 301 having to perform quantization operations for transmitting measurements data to the parameters optimizing unit 303 and a second exemplar 353b of the first codebook to the parameters optimizing unit 303 for receiving said measurements data from said measurement data providing unit 301. The second modular arrangement further shows that the quantization optimizing unit 302 provides a first exemplar 354a of a second codebook to the parameters optimizing unit 303 and a second exemplar 354b of the second codebook to each parameters applying unit 304 for which the parameters optimizing unit 303 has to perform quantization operations for transmitting cooperation parameters to said parameters applying unit 304. The second modular arrangement further shows that each measurement data providing unit 301 having to perform quantization operations for transmitting measurements data to the parameters optimizing unit 303 transmits quantized measurements data 361' to the parameters optimizing unit 303. Each measurement data providing unit 301 that does not have to perform quantization operations for transmitting measurements data to the parameters optimizing unit 303 transmits non-quantized measurements data to the parameters optimizing unit 303 (not shown in FIG. 3B). The second modular arrangement further shows that to the parameters optimizing unit 303 transmits, in quantized form, parameters 362' resulting from the optimization of the figure of merit to each parameters applying unit 304 for which the parameters optimizing unit 303 has to perform quantization operations for transmitting cooperation parameters to said parameters applying unit 304. Each parameters applying unit 304 for which the parameters optimizing unit 303 does not have to perform quantization operations for transmitting cooperation parameters to said parameters applying unit 304 receives non-quantized cooperation parameters from the parameters optimizing unit 303 (not shown in FIG. 3B).

It can be understood that the second modular arrangement matches the architecture of the first communication system shown in FIG. 1A: one measurements data providing unit 301 is located in each access point 110, 111, 112 for providing to the server 100 the random variables statistics; one parameters applying unit 304 is located in each access point 110, 111, 112 for applying the cooperation parameters resulting from an optimization of the figure of merit; and, one parameters optimizing unit 303 and one quantization optimizing unit 302 are located in the server 100. When no mobile terminal is attached to an access point, it is considered that the measurements data to be provided to the server 100 are empty and that any quantization operation for said measurements data is useless. It can also be considered that the measurements data providing units 301 are located in the mobile terminals 120, 121. Therefore, in view of what precedes, the first communication system is, in this case, such that at least one link among the links from the mobile terminals 120, 121 to the access points 110, 112 via which said mobile terminals 120, 121 communicate measurements data implies quantization operations and/or the links from the access points 110, 111, 112, via which said mobile terminals 120, 121 communicate measurements data, to the server 100 implies quantization operations. Moreover, the first communication system is in this case such that at least one link among the links from the server 100 to the access points 110, 111, 112 implies quantization operations.

It can also be understood that the second modular arrangement matches the architecture of the second communication system shown in FIG. 1B: one measurements data providing unit 301 is located in each access point 110, 111, 112 for providing the random variable statistics to at least one master access point among the access points 110, 111, 112; one parameters applying unit 304 is located in each access point 110, 111, 112 for applying the cooperation parameters resulting from an optimization of the figure of merit; and, one parameters optimizing unit 303 and one quantization optimizing unit 302 are located in said at least one master access point. Each master access point is then in charge of performing quantization optimization on behalf of plural access points. When no mobile terminal is attached to an access point, it is considered that the measurements data to be provided to the server 100 are empty and that any quantization operation for said measurements data is useless. It can also be considered that the measurements data providing units 301 are located in the mobile terminals 120, 121. Therefore, in view of what precedes, the second communication system is, in this case, such that at least one link among the links from the mobile terminals 120, 121 to the access points 110, 112 via which said mobile terminals 120, 121 communicate the measurements data implies quantization operations, and at least one link among the links between the access points 110, 111, 112 implies quantization operations.

FIG. 3C schematically represents a third modular arrangement for implementing the present invention.

The third modular arrangement comprises a plurality of measurements data providing units 301, only one of which being shown in FIG. 3C for simplicity considerations. The third modular arrangement further comprises a plurality of parameters applying units 304, only one of which being shown in FIG. 3C for simplicity considerations. The third modular arrangement further comprises one parameters optimizing unit 303, and one quantization optimizing unit 302. The third modular arrangement may comprise plural parameters optimizing unit 303 and/or plural quantization optimizing unit 302.

The third modular arrangement shows that the parameters optimizing unit 303 provides a description 351 of the figure of merit to the quantization optimizing unit 302. The third modular arrangement further shows that the quantization optimizing unit 302 receives from each measurements data providing unit 301 statistics 352 relative to the probability distribution of the random variables to be further measured by the measurements data providing units 301 in the scope of the cooperation phase. The third modular arrangement further shows that the quantization optimizing unit 302 provides a first exemplar 354a of a codebook to the parameters optimizing unit 303 and a second exemplar 354b of the second codebook to each parameters applying unit 304 for which the parameters optimizing unit 303 has to perform quantization operations for transmitting cooperation parameters to said parameters applying unit 304. The third modular arrangement further shows that each measurement data providing unit 301 transmits non-quantized measurements data 361 to the parameters optimizing unit 303. The third modular arrangement further shows that the parameters optimizing unit 303 transmits, in quantized form, cooperation parameters 362' resulting from the optimization of the figure of merit to each parameters applying unit 304 for which the parameters optimizing unit 303 has to perform quantization operations for transmitting cooperation parameters to said parameters applying unit 304. Each parameters applying unit 304 for which the parameters optimizing unit 303 does not have to perform quantization operations for transmitting cooperation parameters to said parameters applying unit 304 receives non-quantized cooperation parameters from the parameters optimizing unit 303 (not shown in FIG. 3C).

It can be understood that the third modular arrangement matches the architecture of the first communication system shown in FIG. 1A: one measurements data providing unit 301 is located in each access point 110, 111, 112 for providing to the server 100 the random variable statistics; one parameters applying unit 304 is located in each access point 110, 111, 112 for applying the cooperation parameters resulting from an optimization of the figure of merit; and, one parameters optimizing unit 303 and one quantization optimizing unit 302 are located in the server 100. The measurements data providing unit 301 are further adapted to transmit measurements data to the parameters optimizing unit 303. When no mobile terminal is attached to an access point, it is considered that the measurements data to be provided to the server 100 are empty and that any quantization operation for said measurements data is useless. It can also be considered that the measurements data providing units 301 are located in the mobile terminals 120, 121. Therefore, in view of what precedes, the first communication system is, in this case, such that at least one link among the links from the server 100 to the access points 110, 111, 112 implies quantization operations.

Figure 4:
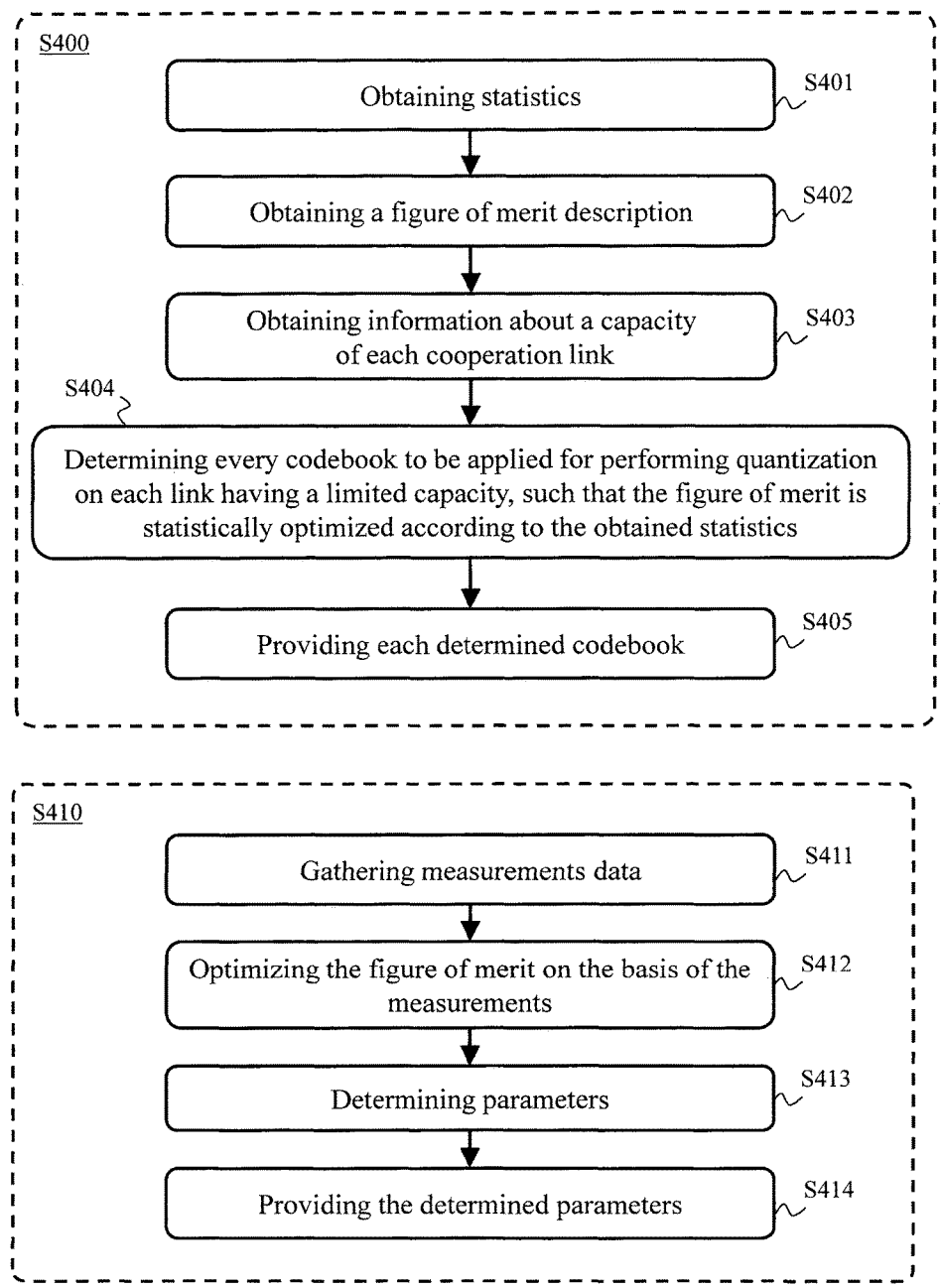
FIG. 4 schematically represents an algorithm for determining cooperation parameters to be applied by node devices of a communication system in order to improve performance of said communication system regarding an environment of said communication system.

FIG. 4 schematically represents an algorithm for determining cooperation parameters to be applied by node devices of a communication system in order to improve performance of said communication system.

As already mentioned, the communication system performs a pre-processing phase S400 and then a cooperation phase S410. The pre-processing phase S400 aims at defining every codebook to be used for quantization operations during the cooperation phase S410. The pre-processing phase S400 starts in a step S401 and ends in a step S405.

The cooperation phase S410 aims at defining cooperation parameters to be applied by said communication system in order to improve performance of the communication system regarding the environment of said communication system. The cooperation phase S410 starts in a step S411 and ends in a step S414.

The communication system is for instance the first communication system shown in FIG. 1A, the second communication system shown in FIG. 1B, or the third communication system shown in FIG. 1C.

In the step S401, the communication system obtains statistics data relative to a probability distribution of random variables representative of the environment in view of which the communication system performance is evaluated. Said statistics data may be a description of a statistical model, e.g. Gaussian vectors, or parameters relative to such a model, e.g. covariance matrices. Said statistics data may therefore be obtained from such a statistical model. Said statistics data may, in a variant, be obtained from long-term measurements of said random variables.

In a following step S402, the communication system obtains a figure of merit to be optimized in the cooperation phase S410 in order to define cooperation parameters to be applied by the communication system in order to improve the communications system performance regarding said environment.

In a following step S403, the communication system obtains information representative of a capacity of each link used in the cooperation phase S410 for transmitting measurements data and/or for transmitting cooperation parameters. The communication system is thus able to determine which link used in the cooperation phase S410 requires quantization operations, and thus requires a codebook definition.

In a following step S404, the communication system determines every codebook on the basis of the figure of merit, such that the figure of merit is statistically optimized according to the statistics data obtained in the step S401. When defining every codebook to be used in the cooperation phase S410, the communication system is thus able to define codebooks having higher code density in respective ranges of values where the obtained statistics data show that the figure of merit is statistically optimized, i.e. such that impact of quantization operations on the communication system performance regarding said environment is statistically minimized.

In the following step S405, the communication system provides the determined codebooks to the concerned node devices of the communication system, i.e. the node devices that are the end-points of the corresponding link that requires quantization operations in the cooperation phase S410.

Once every codebook has been defined and once every node device having to perform quantization operations in the cooperation phase S410 has obtained the applicable codebook, the cooperation phase S410 can take place.

In the step S411, the communication system gathers measurements data. Said measurements data correspond to measurements of the random variables representative of said environment. The measurements data represent an actual state of said environment. Gathering said measurements data may require quantization operations in order to match latency constraints, and in this case, each concerned node device applies the corresponding codebook determined during the pre-processing phase S400.

In a following step S412, the communication system performs optimization of the aforementioned figure of merit in view of the gathered measurements. Performing optimization of the figure of merit means searching the cooperation parameters that lead, as far as possible, to the best result of the figure of merit with regard to the performance of the communication system in view of the gathered measurements.

In a following step S413, the communication system determines cooperation parameters to be applied by the communication system to improve the performance of the communication system relatively to actual characteristics of said environment. The cooperation parameters to be applied result from the optimization of the figure of merit.

In a following step S414, the communication system provides the determined cooperation parameters, or information representative thereof, to the concerned node devices of the communication system. Providing said cooperation parameters, or information representative thereof, may require quantization operations, and in this case, each concerned node device applies the corresponding codebook determined during the pre-processing phase S400.

Thus, by defining every codebook by taking into account the figure of merit such that said figure of merit is statistically optimized in view of the statistics data relative to said random variables, the impact of the quantization operations on the communication system performance regarding said environment is limited.

Let's consider a first particular embodiment in which the random variables are channel coefficients of a downlink virtual MIMO channel, wherein access points obtain transmission channel observations, which can be obtained from downlink measurements fed back from mobile terminals of the communication system and/or can be obtained from uplink measurements performed by said access points considering that each considered transmission channel is substantially symmetrical. It therefore means that the measurements data providing units 301 can be located in the mobile terminals (downlink measurements) and/or in the access points (uplink measurements), or even that several measurements data providing units 301 can exist per access points. Cooperation parameters are in this first particular embodiment modulation and coding parameters, or other signal transmission and protocol parameters. Virtual MIMO channel coefficients estimations $\tilde{h}^{(i)}$ as mentioned hereafter are information representative of said cooperation parameters.

It is further considered in this first particular embodiment that each access point comprises one quantization optimizing unit 302, one parameters optimizing unit 303 and one parameters applying unit 304. Determining the codebooks to be applied to enable one access point to receive data measurements in quantized form is thus performed by said access point. In other words, it corresponds to a de-centralized approach as described with regard to the first modular arrangement shown in FIG. 3A in conjunction with the architecture of the second communication system shown in FIG. 1B.

Let's denote $z_{j,i}$ the quantized form of the measurements data that are obtained by one measurement data providing unit 301 identified by the value of an index j, and that are transmitted from said measurements data providing unit 301 to one parameters optimizing unit 303 identified by the value of an index i. It should be noted that the indexes i and j are strictly positive, and are respectively bounded by the quantity of measurements data providing unit 301 and of parameters optimizing units 303 present in the communication system.

Let's further denote $CL_{j,i}$ the link from the measurements data providing unit 301 identified by the value of the index j to the parameters optimizing units 303 identified by the value of the index i, which means that $z_{j,i}$ correspond to measurements data transmitted in quantized form via the link $CL_{j,i}$. It should be noted that when the measurements data providing unit 301 identified by the value of the index j and the parameters optimizing unit 303 identified by the value of the index i are located inside a same node device, the link $CL_{j,i}$ doesn't typically require quantization operations and therefore $z_{j,i}$ directly correspond to the measurements data that are obtained by the measurements data providing unit 301.

More precisely, by denoting $\hat{h}^{(j)}$ the measurements data that correspond to the virtual MIMO channel coefficients h (i.e. the random variables) and that are obtained by the measurements data providing unit 301 identified by the value of the index j, $z_{j,i}$ correspond to the measurements data $\hat{h}^{(j)}$ after having applied corresponding quantization operations. It has to be noted that h is a vectored version of the virtual MIMO channel coefficients. It has to be further noted that $\hat{h}^{(j)}$ is a vectored version of the virtual MIMO channel observations performed by the measurements data providing unit 301 identified by the value of the index j.

By denoting $CB_{j,i}$ the quantization operations relying on a codebook $C_{j,i}$ applied for transmitting the measurements data in quantized form $z_{j,i}$ on the link $CL_{j,i}$ having a limited capacity $R_{j,i}$ in terms of data rate, the following relationship can be expressed:

$$CB_{j,i}(\hat{h}^{(j)}) = z_{j,i}$$

wherein $z_{j,i} \in C_{j,i}$ and $|C_{j,i}| = 2^{R_{j,i}}$ wherein |A| represents the cardinality of A.

Virtual MIMO channel coefficients estimation performed by the parameters optimizing unit 303 identified by the value of the index i from the measurements data in quantized form $z_{j,i}$ is denoted herein $\tilde{h}^{(i)}$. By considering that the virtual MIMO channel coefficients estimation $\tilde{h}^{(i)}$ performed by each parameters optimizing unit 303 (identified by the index i) is a weighted linear combination of the measurements data in quantized form $z_{j,i}$ gathered by said parameters optimizing unit 303, the following relationship can be expressed:

$$\tilde{h}^{(i)} = \sum_j (W_{j,i} z_{j,i}) = \sum_j (W_{j,i} CB_{j,i}(\hat{h}^{(j)}))$$

wherein $W_{j,i}$ are positive semi-definite weighting matrices such that:

$$\sum_j W_{j,i} = I$$

wherein I is an identity matrix.

The communication system performance with regard to the virtual MIMO channel is represented from the standpoint of each parameters optimizing unit 303 (identified by the index i) by a figure of merit $\mathcal{F}^{(i)}$, which has to be optimized in view of the virtual MIMO channel coefficients estimation $\tilde{h}^{(i)}$. Determining the codebooks $C_{j,i}$ and the weighting matrices $Q_{j,i}$ by taking into account the figure of merit $\mathcal{F}^{(i)}$ representing the performance of the communication system with regard to the virtual MIMO channel from the standpoint of each parameters optimizing unit 303 (identified by the index i) thus improves said performance.

In said first particular embodiment, the figure of merit $\mathcal{F}^{(i)}$ is representative of an estimation error, to be minimized, between the virtual MIMO channel coefficients estimation $\tilde{h}^{(i)}$ and the effective virtual MIMO channel coefficients h, which can be expressed as minimizing the mean-squared error between the virtual MIMO channel coefficients estimation $\tilde{h}^{(i)}$ and the effective virtual MIMO channel coefficients h (the effective virtual MIMO channel coefficients h being a priori unknown):

$$\mathcal{F}^{(i)}(\tilde{h}^{(i)}) = \mathbb{E}_h \| h - \tilde{h}^{(i)} \|^2$$

wherein $\mathbb{E}_h$ represents the mathematical expectation over the virtual MIMO channel coefficients h.

In other words, considering all links $CL_{j,i}$ toward each parameters optimizing unit 303 (identified by the index i), the set $\{W_{j,i}\}$ of weighting matrices $W_{j,i}$ and the set $\{C_{j,i}\}$ of codebooks $C_{j,i}$ which have to be applied during the cooperation phase S410, and which statistically minimize the following expression, should be determined by the quantization optimizing unit 302 in charge of configuring said parameters optimizing unit 303:

$$\mathbb{E}_{h,\{\hat{h}^{(j)}\}} \| h - \sum_j (W_{j,i} z_{j,i}) \|^2$$

wherein $\mathbb{E}_{h,\{\hat{h}^{(j)}\}}$ represents the mathematical expectation over the statistics of the virtual MIMO channel coefficients h and over the set $\{\hat{h}^{(j)}\}$ of the measurements data $\hat{h}^{(j)}$ that are obtained by the measurements data providing units 301 (identified by the index j).

For each parameters optimizing unit 303 (identified by the index i), sets $\{W_{j,i}\}$ of candidate weighting matrices $W_{j,i}$ and sets $\{C_{j,i}\}$ of candidate codebooks $C_{j,i}$ are randomly defined by the quantization optimizing unit 302 in charge of configuring said parameters optimizing units 303, until finding the set $\{W_{j,i}\}$ of weighting matrices $W_{j,i}$ and the set $\{C_{j,i}\}$ of codebooks $C_{j,i}$ which statistically minimize, e.g. evaluated with a Monte-Carlo simulation, the mean-squared error between the virtual MIMO channel coefficients estimation $\tilde{h}^{(i)}$ and the virtual MIMO channel coefficients h.

In a variant, for each parameters optimizing unit 303 (identified by the index i), sets $\{C_{j,i}\}$ of candidate codebooks $C_{j,i}$ are randomly defined and corresponding sets $\{W_{j,i}\}$ of candidate weighting matrices $W_{j,i}$ are defined by optimization using semi-definite programming according to the sets $\{C_{j,i}\}$ of candidate codebooks $C_{j,i}$ randomly defined, by the quantization optimizing unit 302 in charge of configuring said parameters optimizing unit 303, until finding the set $\{C_{j,i}\}$ of codebooks $C_{j,i}$ and the corresponding set $\{W_{j,i}\}$ of weighting matrices $W_{j,i}$ which statistically minimize, e.g. evaluated with a Monte-Carlo simulation, the mean-squared error between the virtual MIMO channel coefficients estimation $\tilde{h}^{(i)}$ and the virtual MIMO channel coefficients h.

In another variant (providing improved performances in terms of optimality and computational needs), considering that quantization errors are uncorrelated, a trace-based simplified relationship can be drawn. It reduces complexity for determining the mathematical expectation for each parameters optimizing unit 303 (identified by the index i), over the effective virtual MIMO channel coefficients h and over the set $\{\hat{h}^{(j)}\}$ of the measurements data $\hat{h}^{(j)}$ that are obtained by the measurements data providing unit 301 (identified by the index j) that have to transmit measurements data to said parameters optimizing unit 303. In other words, considering all links $CL_{j,i}$ toward each parameters optimizing unit 303 (identified by the index i), the set $\{W_{j,i}\}$ of weighting matrices $W_{j,i}$ and the set $\{C_{j,i}\}$ of codebooks $C_{j,i}$ which have to be applied during the cooperation phase S410 and which statistically minimize the following expression should be determined by the quantization optimizing units 302 in charge of configuring said parameters optimizing unit 303:

$$\mathbb{E}_{h,\hat{h}^{(j)}}\{\|h - \sum_j (W_{j,i} z_{j,i})\|^2\} = \sum_j \text{trace}(W_{j,i} Q_{z_{j,i}} W_{j,i}^\dagger)$$

wherein $Q_{z_{j,i}}$ represents the error covariance matrix of the measurements data in quantized form $z_{j,i}$ and can be expressed as follows:

$$Q_{z_{j,i}} = \mathbb{E}[(h - z_{j,i})(h - z_{j,i})^H]$$

By definition, the covariance matrices $Q_{z_{j,i}}$ depends on the respective codebooks $C_{j,i}$ used for obtaining, by quantization operations, the respective measurements data in quantized form $z_{j,i}$ from the respective measurements data $\hat{h}^{(j)}$. The purpose of the pre-processing phase S400 is to determine, for each parameters optimizing unit 303 (identified by the index i), the codebooks $C_{j,i}$ in order to maximize the figure of merit $\mathcal{F}^{(i)}$ from the standpoint of said parameters optimizing unit 303. As a result, each covariance matrix $Q_{z_{j,i}}$ can be expressed as follows:

$$Q_{z_{j,i}} = 2Q_j + C_h - \sum_{k=1}^{2^{R_{j,i}}} \alpha_{j,i,k} x_k^{(j,i)} x_k^{(j,i)H}$$

wherein $C_h$ represents a covariance matrix representative a probability distribution of the virtual MIMO channel coefficients h, and $Q_j$ represents an estimation error covariance matrix obtained from long-term statistics data obtained beforehand by the measurements data providing unit 301 identified by the value of the index j, and wherein $x_k^{(j,i)}$ represents the k-th codeword from amongst the codewords $x^{(j,i)}$ of the considered codebook $C_{j,i}$, wherein $A^H$ represents the Hermitian conjugate of A, and wherein $\alpha_{j,i,k}$ is a parameter representing a probability that the measurements data $\hat{h}^{(j)}$ belong to a Voronoi region associated to a centroid defined by the considered codeword $x_k^{(j,i)}$. Said Voronoi region (as sometimes referred to as cell) is a space inside which any point is closer to said centroid than any other codeword $x_k^{(j,i)}$ of the considered codebook $C_{j,i}$. Each parameter $\alpha_{j,i,k}$ may be obtained by numerical simulations.

The estimation error covariance matrix $Q_j$ may be expressed as follows:

$$Q_j = \mathbb{E}[(h - \hat{h}_s^{(j)})(h - \hat{h}_s^{(j)})^H]$$

wherein $\hat{h}_s^{(j)}$ represents measurements of the virtual MIMO channel performed beforehand by the measurements data providing unit 301 identified by the value of the index j for building long-term statistics, and wherein $Q_j$ therefore represents said long-term statistics.

The estimation error covariance matrix $Q_3$ may, in a variant, be obtained from a statistical model, either by the measurements data providing unit 301 identified by the value of the index j or by the quantization optimizing units 302 in charge of configuring the considered parameters optimizing unit 303.

For each parameters optimizing units 303 (identified by the index i), each codebook $C_{j,i}$ used for providing measurements data to said parameters optimizing units 303 is defined by determining intermediate matrices $B_{j,i}$ defined on the basis of the corresponding covariance matrices $Q_{z_{j,i}}$ according to the following system of equations:

$$\begin{cases} Q_{z_{j,i}} = Q_{C_{j,i}} + (I - (I+Q_j)^{-1})(I - (I+Q_j)^{-1})^H + (I+Q_j)^{-1} Q_j (I+Q_j)^{-H} \\ Q_{C_{j,i}} = 2 N^{1/n} \beta \, 2\pi \left(\frac{n+1}{n}\right)^{n+1} B_{j,i}^{-1} \\ \det(\Phi) = 1 \\ \Phi = \frac{1}{2}\begin{bmatrix} \mathcal{R}\left(B_{j,i}^{1/2}(I+Q_j)^{-1} B_{j,i}^{H/2}\right) & \mathfrak{I}\left(B_{j,i}^{1/2}(I+Q_j)^{-1} B_{j,i}^{H/2}\right) \\ \mathfrak{I}\left(B_{j,i}^{1/2}(I+Q_j)^{-1} B_{j,i}^{H/2}\right) & \mathcal{R}\left(B_{j,i}^{1/2}(I+Q_j)^{-1} B_{j,i}^{H/2}\right) \end{bmatrix} \end{cases}$$

wherein $\mathcal{R}(A)$ represents the real part of complex A and $\mathfrak{I}(A)$ represents the imaginary part of complex A, wherein $A^{-H}$ represents the inverse of the Hermitian conjugate of A, wherein $A^{H/2}$ represents the square root of the Hermitian conjugate of A, and wherein N represents the cardinality $|C_{j,i}|$ of the codebook $C_{j,i}$, $\beta$ represents a scalar and n represents the cardinality of the virtual MIMO channel vector h.

It appears from this system of equations that each covariance matrix $Q_{z_{j,i}}$ can be expressed as a sum of a quantization error covariance matrix $Q_{C_{j,i}}$ relative to the codebook $C_{j,i}$ and a channel estimation error covariance matrix (remaining part of the definition of the covariance matrix $Q_{z_{j,i}}$ expressed here above) that can be derived from the applicable estimation error covariance matrix $Q_j$.

Each quantization optimizing unit 302 optimizes the aforementioned trace-based expression in order to define the set $\{W_{j,i}\}$ of weighting matrices $W_{j,i}$ and the set $\{B_{j,i}\}$ of intermediate matrices $B_{j,i}$ defining the quantization operations to be applied during the cooperation phase S410. Indeed, performing optimization on matrices instead of codebooks is easier and therefore more cost-effective in terms of processing resources.

Optimization is then performed in order to select the couple of intermediate matrix $B_{j,i}$ and corresponding weighting matrix $W_{j,i}$ which minimizes said trace-based expression, by relying on semi-definite programming.

Figure 5:
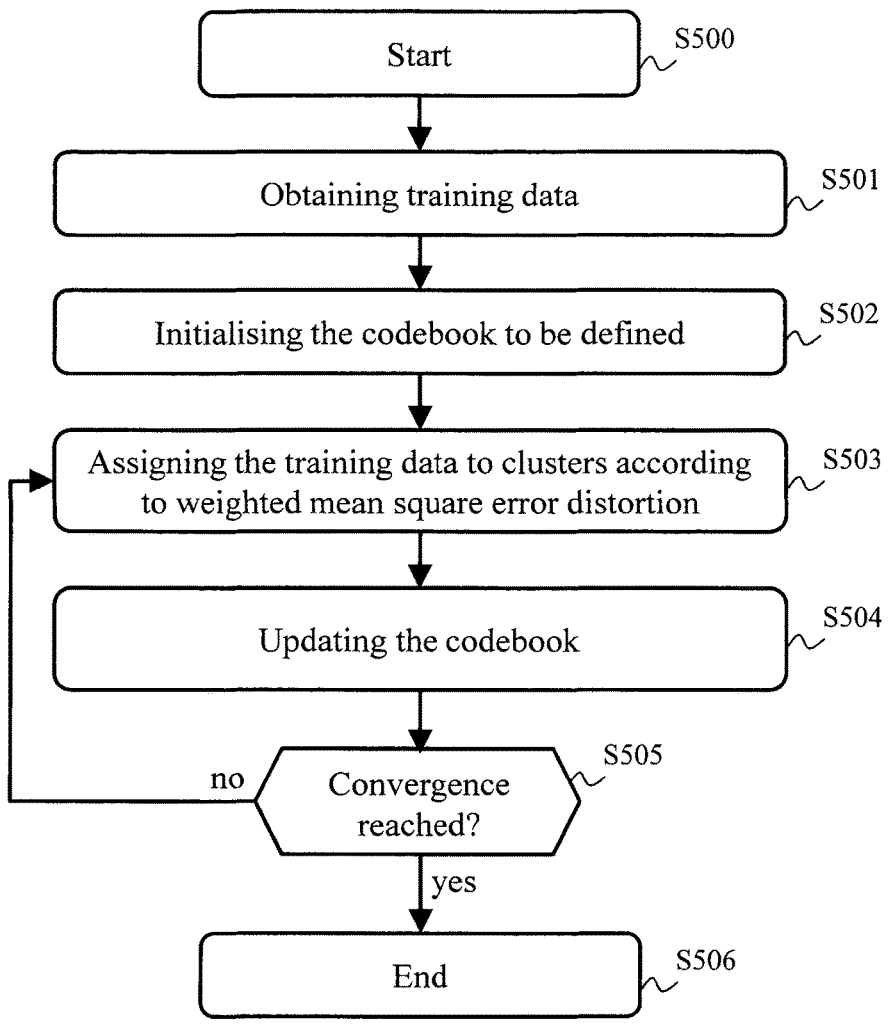
FIG. 5 schematically represents an algorithm for determining codebooks from intermediate matrices by using a Lloyd max algorithm.

The corresponding codebook $C_{j,i}$ to be applied to perform quantization operations for transmitting measurements data in quantized form $z_{j,i}$ via the link $CL_{j,i}$ is then derived from the selected intermediate matrix $B_{j,i}$ by using a Lloyd max algorithm as detailed hereafter with regard to FIG. 5.

According to what precedes, during the pre-processing phase S400, the quantization optimizing unit 302 obtains statistics data relative to a probability distribution of the virtual MIMO channel coefficients h, which are random variables. Said statistics are for instance based on long-term measurements $\hat{h}_s^{(j)}$ of the virtual MIMO channel performed beforehand by the concerned measurements data providing unit 301 identified by the value of the index j and, said long-term measurements $\hat{h}_s^{(j)}$ being provided without quantization operations by each measurement data providing unit 301 to the concerned quantization optimizing unit 302, which can then deduce the corresponding estimation error covariance matrix $Q_j$. The estimation error covariance matrix $Q_j$ may, in a variant, be obtained by the quantization optimizing unit 302 by relying on a statistical model. In a preferred embodiment, the estimation error covariance matrix $Q_j$ is obtained by the corresponding measurement data providing unit 301 identified by the value of the index j, which then transmits without quantization operations the estimation error covariance matrix $Q_j$ to the concerned quantization optimizing unit 302.

The quantization optimizing unit 302 then provides, to the parameters optimizing unit 303 identified by the value of the index i and to the measurements data providing unit 301 identified by the value of the index j, the codebook $C_{j,i}$ determined to be applied, so that said measurements data providing unit 301 is able to further transmit measurements data in quantized form $z_{j,i}$ via the link $CL_{j,i}$ to said parameters optimization unit 303. No quantization operations are, in said first particular embodiment, needed to provide the cooperation parameters or information representative thereof, and therefore no codebooks need to be determined to enable the parameters optimizing units 303 to transmit said cooperation parameters, or information representative thereof, to the respective parameters applying units 304.

In one more particular embodiment of said first particular embodiment, instead of providing the codewords $x^{(j,i)}$ of the codebook $C_{j,i}$ to the parameters optimizing unit 303 identified by the value of the index i and to the measurements data providing unit 301 identified by the value of the index j, the quantization optimizing unit 302 provides an equivalent codebook of codewords $W_{j,i} x^{(j,i)}$. Thus, the parameters optimizing unit 303 identified by the value of the index i is able to determine the virtual MIMO channel coefficients estimation $\hat{h}^{(i)}$, and therefore the cooperation parameters, by directly adding the measurements data as received in quantized form from the concerned measurements data providing units 301.

It should be noted that, although said first particular embodiment concerns a virtual MIMO channel, the same principles are applicable to a communication system for which cooperation parameters having an impact on an environment of the communication system have to be determined, said environment being represented by measurable random variables, a figure of merit relative to performance of the communication system regarding said environment having to be optimized for determining said cooperation parameters.

It should further be noted that, although said first particular embodiment has been described by considering that each access point comprises one quantization optimizing unit 302, the same principles would apply by remotely locating one quantization optimizing unit 302 in the server 100 or in a master access point among said access points. In this case, the server 100 or said master access point performs quantization optimization, i.e. determines the codebooks $C_{j,i}$ and the corresponding weighting matrices $W_{j,i}$ on behalf of each parameters optimizing unit 303 (identified by the index i). The same principles would apply by remotely locating one quantization optimizing unit 302 in the server 100 or in said master access point for determining the codebooks $C_{j,i}$ and the corresponding weighting matrices $W_{j,i}$ on behalf of only a subset of the parameters optimizing units 303, whereas the remaining codebooks $C_{j,i}$ and the corresponding weighting matrices $W_{j,i}$ are determined in a distributed fashion, as detailed here above with regard to said first particular embodiment, or in another master access point. In this case, each remote quantization optimizing unit 302 transmits the applicable codebooks $C_{j,i}$ and the corresponding weighting matrices $W_{j,i}$, or the equivalent codebooks of respective codewords $W_{j,i} x^{(j,i)}$, to each parameters optimizing unit 303 (identified by the index i) that said quantization optimizing unit 302 is in charge of configuring.

In one more particular embodiment of said first particular embodiment, cooperation between two access points is envisaged, wherein each access point comprises one parameters optimizing unit 303. Moreover it is considered that there is no need to perform quantization operations to enable each parameters optimizing unit 303 to receive measurements data from one measurements data providing unit 301 that has the same index value. Typically, in this situation, each access point comprises one parameters optimizing unit 303 and one measurements data providing unit 301, or each access point comprises one parameters optimizing unit 303 and at least one measurements data providing unit 301 is located in at least one respective mobile terminal communicating with said access point, without any link capacity limitation for feeding back the measurements data from said mobile terminal to said access point. Determining the codebooks to be applied is simplified. Indeed, the statements above leads to the following relationships:

$$z_{1,1} = \hat{h}^{(1)}$$

$$z_{2,2} = \hat{h}^{(2)}$$

$$Q_{z_{1,1}} = Q_1$$

$$Q_{z_{2,2}} = Q_2$$

$$W_{1,1} = I - W_{2,1}$$

$$W_{2,2} = I - W_{1,2}$$

$$W_{2,1} = Q_1 (Q_1 + Q_{z_{2,1}})^{-1}$$

$$W_{1,2} = Q_2 (Q_2 + Q_{z_{1,2}})^{-1}$$

Determining the weighting matrices $W_{j,i}$ is more straight forward and optimization for selecting the appropriate intermediate matrices $B_{2,1}$ and $B_{1,2}$ for further selecting the respective codebooks $C_{2,1}$ and $C_{1,2}$ to be effectively applied can be performed by minimizing the following trace-based expressions:

$$\mathbb{E}_{h,\{\hat{h}^{(2)}\}} \|h - (W_{2,1} z_{2,1} + W_{1,1} z_{1,1})\|^2 = \text{trace}(Q_{z_{2,1}} (Q_1 + Q_{z_{2,1}})^{-1} Q_1)$$

$$\mathbb{E}_{h,\{\hat{h}^{(1)}\}} \|h - (W_{1,2} z_{1,2} + W_{2,2} z_{2,2})\|^2 = \text{trace}(Q_{z_{1,2}} (Q_2 + Q_{z_{1,2}})^{-1} Q_2)$$

It should be noted that, although said more particular embodiment of said first particular embodiment concerns a virtual MIMO channel relying on a cooperation between two access points, the same principles are applicable to a communication system having two node devices for which cooperation parameters having an impact on an environment of the communication system have to be determined, said environment being represented by measurable random variables, a figure of merit relative to performance of the communication system regarding said environment having to be optimized for determining said cooperation parameters.

It should further be noted that, although said more particular embodiment of said first particular embodiment have been described by considering that each access point comprises one quantization optimizing unit 302, the same principles would apply by remotely locating one quantization optimizing unit 302 in the server 100 or in a master access point among said access points. In this case, the server 100 or said master access point performs quantization optimization, i.e. determines the codebooks $C_{j,i}$ and the corresponding weighting matrices $W_{j,i}$ on behalf of each parameters optimizing unit 303 (identified by the index i). The same principles would apply by remotely locating one quantization optimizing unit 302 in the server 100 for determining the codebooks $C_{j,i}$ and the corresponding weighting matrices $W_{j,i}$ on behalf of one parameters optimizing unit 303 located in one access point, whereas the remaining codebooks $C_{j,i}$ and the corresponding weighting matrices $W_{j,i}$ are determined by one quantization optimizing unit 302 located in the other access point. In this case, the remote quantization optimizing unit 302 transmits the applicable codebooks $C_{j,i}$ and the corresponding weighting matrices $W_{j,i}$ or the equivalent codebooks of respective codewords $\tilde{W}_{j,i} x^{(j,i)}$, to the parameters optimizing unit 303 (identified by the index i) that said remote quantization optimizing unit 302 is in charge of configuring.

Let's consider a second particular embodiment in which the random variables are still channel coefficients of a downlink virtual MIMO channel, wherein access points obtain transmission channel observations, which can be obtained from downlink measurements fed back from mobile terminals of the communication system and/or can be obtained from uplink measurements performed by said access points considering that each considered transmission channel is substantially symmetrical. It therefore means that the measurements data providing units 301 can be located in the mobile terminals (downlink measurements) or in the access points (uplink measurements), even several measurements data providing units 301 per access points. Since the access points can rely on downlink measurements as well as on uplink measurements, such measurements data providing units 301 can be located in the mobile terminals and in the access points. In this second particular embodiment, the cooperation parameters are again modulation and coding parameters, or other signal transmission and protocol parameters. Virtual MIMO channel coefficients estimation $\tilde{h}^{(0)}$ as mentioned hereafter is information representative of said cooperation parameters.

It is further considered in this second particular embodiment that each access point comprises one parameters applying unit 304. A master access point among said access points, or the server 100, comprises one quantization optimizing unit 302 and one parameters optimizing unit 303. Determining the codebooks to be applied to enable each access point to receive data measurements in quantized form is thus performed by said master access point or by said server 100. In other words, it corresponds to a centralized approach as described with regard to the first modular arrangement shown in FIG. 3A in conjunction with the architecture of the third communication system shown in FIG. 1C when no quantization operations are needed to provide the cooperation parameters, or information representative thereof, to the access points, and with regard to the second modular arrangement shown in FIG. 3B in conjunction with the architecture of the third communication system shown in FIG. 1C when quantization operations are needed to provide the cooperation parameters, or information representative thereof, to the access points.

The quantization optimizing unit 302 and the parameters optimizing unit 303 are considered in said second particular embodiment as co-localised in the server 100 or in the master access point for the sake of simplicity of understanding. However, the same principles apply when the quantization optimizing unit 302 and the parameters optimizing unit 303 are not co-localised (i.e. quantization optimization is performed by a first device of the communications network and parameters optimization is performed by a second device of the communications network).

Let's consider a first situation wherein the codebooks to be applied are determined by the server 100, wherein the cooperation parameters optimization is also performed by the server 100, and wherein no quantization operations are needed to provide the cooperation parameters, or information representative thereof, to the access points. Let's reuse the notations used for describing the first particular embodiment and let's represent the parameters optimizing unit 303 by the index value "0".

Therefore, by denoting $CB_{j,0}$ the quantization operations relying on a codebook $C_{j,0}$ applied for transmitting the measurements data in quantized form $z_{j,0}$ on the link $CL_{j,0}$ having a limited capacity $R_{j,0}$ in terms of data rate, the following relationship can be expressed:

$$CB_{j,0}(\hat{h}^{(j)}) = z_{j,0}$$

wherein $z_{j,0} \in C_{j,0}$ and $|C_{j,0}| = 2^{R_{j,0}}$

The cooperation parameters optimization is thus driven by the following formula:

$$\tilde{h}^{(0)} = \sum_j (W_{j,0} z_{j,0}) = \sum_j (W_{j,0} CB_{j,0}(\hat{h}^{(j)}))$$

wherein $W_{j,0}$ are positive semi-definite weighting matrices such that:

$$\sum_j W_{j,0} = I$$

The codebooks $C_{j,0}$ and the weighting matrices $W_{j,0}$ are determined by the quantization optimizing unit 302, located in the server 100, during the pre-processing phase S400, from the statistics of the random variables h. Then, during the cooperation phase S410, the measurements data $\hat{h}^{(j)}$ obtained by the measurements data providing units 301 undergo respective quantization operations $CB_{j,0}$ using respectively the codebooks $C_{j,0}$ to obtain measurements data in quantized form $z_{j,0}$, which are then transmitted by said measurements data providing units 301 to the parameters optimizing unit 303 via the respective links $CL_{j,0}$. The parameters optimizing unit 303 is then able to determine the virtual MIMO channel coefficients estimation $\tilde{h}^{(0)}$ and to provide the virtual MIMO channel coefficients estimation $\tilde{h}^{(0)}$ to each parameters applying unit 304.

In said first situation of said second particular embodiment, the figure of merit $\mathcal{F}$ is representative of an estimation error, to be minimized, between the virtual MIMO channel coefficients estimation $\tilde{h}^{(0)}$ and the effective virtual MIMO channel coefficients h, which can be expressed as minimizing the mean-squared error between the virtual MIMO channel coefficients estimation $\tilde{h}^{(0)}$ and the effective virtual MIMO channel coefficients h (the effective virtual MIMO channel coefficients h being a priori unknown):

$$\mathcal{F}(\tilde{h}^{(0)}) = \mathbb{E}_h \|h - \tilde{h}^{(0)}\|^2$$

The set $\{W_{j,0}\}$ of weighting matrices $W_{j,0}$ and the set $\{C_{j,0}\}$ of codebooks $C_{j,0}$ which have to be applied for receiving measurements data in quantized form from the measurements data providing units 301 (identified by the index j) during the cooperation phase S410 have to minimize the following expression:

$$\mathbb{E}_{h,\{\hat{h}^{(j)}\}} \| h - \sum_j (W_{j,0} CB_{j,0}(\hat{h}^{(j)})) \|^2$$

Sets $\{W_{j,0}\}$ of candidate weighting matrices $W_{j,0}$ and sets $\{C_{j,0}\}$ of candidate codebooks $C_{j,0}$ are randomly defined by the quantization optimizing unit 302, until finding the set $\{W_{j,0}\}$ of weighting matrices $W_{j,0}$ and the set $\{C_{j,0}\}$ of codebooks $C_{j,0}$ which statistically minimize, e.g. evaluated with a Monte-Carlo simulation, the mean-squared error between the virtual MIMO channel coefficients estimation $\hat{h}^{(o)}$ and the virtual MIMO channel coefficients h.

In a variant, sets $\{C_{j,0}\}$ of candidate codebooks $C_{j,0}$ are randomly defined, and corresponding sets $\{W_{j,0}\}$ of candidate weighting matrices $W_{j,0}$ are defined by optimization using semi-definite programming according to the respective sets $\{C_{j,0}\}$ of candidate codebooks $C_{j,0}$ randomly defined, by the optimizing unit 302, until finding the set $\{C_{j,0}\}$ of codebooks $C_{j,0}$ and the corresponding set $\{W_{j,0}\}$ of weighting matrices $W_{j,0}$ which statistically minimize, e.g. evaluated with a Monte-Carlo simulation, the mean-squared error between the virtual MIMO channel coefficients estimation (o) and the virtual MIMO channel coefficients h.

In another variant (providing improved performances in terms of optimality and computational needs), considering that quantization errors are uncorrelated, a trace-based simplified relationship can be drawn. It reduces complexity for determining the mathematical expectation over the effective virtual MIMO channel coefficients h and over the set $\{\hat{h}^{(j)}\}$ of the measurements data $\hat{h}^{(j)}$ that are obtained by the measurements data providing units 301 (identified by the index j). In other words, considering all links $CL_{j,0}$ toward the parameters optimizing unit 303, the set $\{W_{j,0}\}$ of weighting matrices $W_{j,0}$ and the set $\{C_{j,0}\}$ of codebooks $C_{j,0}$ which have to be applied during the cooperation phase S410 and which statistically minimize the following expression should be determined by the quantization optimizing unit 302:

$$\mathbb{E}_{h,\{\hat{h}^{(j)}\}} \| h - \sum_j (W_{j,0} z_{j,0}) \|^2 = \sum_j \mathrm{trace}(W_{j,0} Q_{z_{j,0}} W_{j,0}^\dagger)$$

wherein $Q_{z_{j,0}}$ represents the error covariance matrix of the measurements data in quantized form $z_{j,0}$.

By definition, the covariance matrices $Q_{z_{j,0}}$ depends on the respective codebooks $C_{j,0}$ used for obtaining by quantization operations the respective measurements data in quantized form $z_{j,0}$ from the respective measurements data $\hat{h}^{(j)}$. The purpose of the pre-processing phase S400 is to determine the codebooks $C_{j,0}$ in order to maximize the figure of merit F. As a result, each covariance matrix $Q_{z_{j,0}}$ can be expressed as follows:

$$Q_{z_{j,0}} = 2Q_j + C_h - \sum_{k=1}^{2^{R_{j,0}}} \alpha_{j,0,k} x_k^{(j,0)} x_k^{(j,0)H}$$

wherein $x_k^{(j,0)}$ represents the k-th codeword from amongst the codewords $x^{(j,0)}$ of the considered codebook $C_{j,0}$, and wherein $\alpha_{j,0,k}$ is a parameter representing a probability that the measurements data $\hat{h}^{(j)}$ belongs to a Voronoi region associated to a centroid defined by the considered codeword $x_k^{(j,0)}$. Each parameter $\alpha_{j,0,k}$ may be obtained by numerical simulations.

Each codebook $C_{j,0}$ is defined by determining intermediate matrices $B_{j,0}$ defined on the basis of the corresponding covariance matrices $Q_{z_{j,0}}$ according to the following system of equations:

$$\begin{cases} Q_{z_{j,0}} = Q_{C_{j,0}} + (I - (I+Q_j)^{-1})(I - (I+Q_j)^{-1})^H + \\ \qquad (I+Q_j)^{-1} Q_j (I+Q_j)^{-H} \\ Q_{C_{j,0}} = 2\, N'^{1/n} \beta' 2\pi \left(\dfrac{n+1}{n}\right)^{n+1} B_{j,0}^{-1} \\ \det(\Phi) = 1 \\ \Phi = \dfrac{1}{2}\begin{bmatrix} \mathcal{R}\!\left(B_{j,0}^{1/2}(I+Q_j)^{-1} B_{j,0}^{H/2}\right) & \mathfrak{J}\!\left(B_{j,0}^{1/2}(I+Q_j)^{-1} B_{j,0}^{H/2}\right) \\ \mathfrak{J}\!\left(B_{j,0}^{1/2}(I+Q_j)^{-1} B_{j,0}^{H/2}\right) & \mathcal{R}\!\left(B_{j,0}^{1/2}(I+Q_j)^{-1} B_{j,0}^{H/2}\right) \end{bmatrix} \end{cases}$$

wherein N' represents the cardinality of the codebook $C_{j,0}$ and $\beta'$ represents a scalar.

It appears from this system of equations that each covariance matrix $Q_{z_{j,0}}$ can be expressed as a sum of a quantization error covariance matrix $Q_{C_{j,0}}$ and a channel estimation error covariance matrix (remaining part of the definition of the covariance matrix $Q_{z_{j,0}}$ expressed here above) that can be derived from the applicable estimation error covariance matrix $Q_j$.

The quantization optimizing unit 302 optimizes the aforementioned trace-based expression in order to define the set $\{W_{j,0}\}$ of weighting matrices $W_{j,0}$ and the set $\{B_{j,0}\}$ of intermediate matrices $B_{j,0}$ defining the quantization operations to be applied during the cooperation phase S410. Indeed, performing optimization on matrices instead of codebooks is easier and therefore more cost-effective in terms of processing resources.

Optimization is then performed in order to select the couple of intermediate matrix $B_{j,0}$ and corresponding weighting matrix $W_{j,0}$ which minimizes said trace-based expression, by relying on semi-definite programming.

The corresponding codebook $C_{j,0}$ to be applied to perform quantization operations for transmitting measurements data in quantized form $z_{j,0}$ via the link $CL_{j,0}$ is then derived from the selected intermediate matrix $B_{j,0}$ by using a Lloyd max algorithm, as already explained with regard to the first particular embodiment and to FIG. 5.

The quantization optimizing unit 302 then provides, to the measurements data providing unit 301 identified by the value of the index j, the codebook $C_{j,0}$ determined to be applied, so that the measurements data providing unit 301 identified by the value of the index j is able to further transmit measurements data in quantized form $z_{j,0}$ via the link $CL_{j,0}$ to the parameters optimizing unit 303. No other codebooks are necessary since no quantization operations are, in said first situation of said second particular embodiment, needed to provide the cooperation parameters or information representative thereof. When the quantization optimizing unit 302 and the parameters optimizing unit 303 are not co-localised (i.e. quantization optimization is performed by a first device of the communications network and parameters optimization is performed by a second device of the communications network), the quantization optimizing unit 302 provides, to the parameters optimizing unit 303, said determined codebooks $C_{j,0}$, so that said parameters optimizing unit 303 is able to further receive measurements data in quantized form $z_{j,0}$ via the link $CL_{j,0}$ from the respective measurements data providing units 301 (identified by the index j).

It should be noted that, although said first situation of said second particular embodiment concerns a virtual MIMO channel, the same principles are applicable to a communication system for which cooperation parameters having an impact on an environment of the communication system have to be determined, said environment being represented by measurable random variables, a figure of merit relative to performance of the communication system regarding said environment having to be optimized for determining said cooperation parameters.

Let's now consider a second situation wherein the codebooks to be applied are still determined by the server 100 (or by the master access point), and wherein parameters optimization is also performed by the server 100 (or by the master access point), but wherein quantization operations are needed to provide the cooperation parameters, or information representative thereof, to the access points. Let's reuse the notations used for describing the first situation of the second particular embodiment and let's again represent the parameters optimizing unit 303 by the index value "0".

Therefore, considering channel coefficients estimation $\tilde{h}^{(i)}$ and by denoting $CB_{0,i}$ the quantization operations relying on a codebook $C_{0,i}$ applied for transmitting to the parameters applying unit 304 identified by the value of the index i the cooperation parameters, or information representative thereof, in quantized form $z_{0,i} = \tilde{h}^{(i)}$ on the link $CL_{0,i}$ having a limited capacity $R_{0,i}$ in terms of data rate, the following relationship can be expressed:

$$CB_{0,i}(\tilde{h}^{(i)}) = z_{0,i}$$

wherein $z_{0,i} \in C_{0,i}$ and $|C_{0,i}| = 2^{R_{0,i}}$

The cooperation parameters optimization is thus driven by the following formula:

$$\tilde{h}^{(i)} = \sum_j (W_{j,0}^{(i)} z_{j,0}) = \sum_j \left( W_{j,0}^{(i)} CB_{j,0}(\hat{h}^{(j)}) \right)$$

wherein $W_{j,0}^{(i)}$ are positive semi-definite weighting matrices determined by the quantization optimizing unit 302 for each parameters applying unit 304 (identified by the index i) such that:

$$\sum_j W_{j,0}^{(i)} = 1$$

It therefore means that the links $CL_{0,i}$ have a rate $R_{0,i}$ that shall be taken into account during optimization performed by the quantization optimizing unit 302.

By relying on the same expression of the figure of merit as in said first particular embodiment, the set $\{W_{j,0}^{(i)}\}$ of weighting matrices $W_{j,0}^{(i)}$, the set $\{C_{j,0}\}$ of codebooks $C_{j,0}$ and the codebook $C_{0,i}$, which have to be applied with regard to cooperation parameters to be applied by each quantization optimizing unit 302 (identified by the index i) during the cooperation phase S410 have to be determined by the quantization optimizing unit in order to minimize the following expression:

$$\max_i \left( \mathbb{E}_{h,\{\hat{h}^{(j)}\}} \left\| h - CB_{0,i}\left( \sum_j \left( W_{j,0}^{(i)} CB_{j,0}(\hat{h}^{(j)}) \right) \right) \right\|^2 \right)$$

Contrary to the first situation of said second particular embodiment, the channel coefficients estimation $\tilde{h}^{(i)}$ differs from one parameters applying unit 304 to another, i.e. from one access point to another (whereas, in the first situation of said second particular embodiment, the same channel coefficients estimation $\tilde{h}^{(0)}$ is transmitted by the parameters optimizing unit 303 to all parameters applying unit 304, i.e. all access points participating in the virtual MIMO channel). It would be a non-sense in terms of overhead, when considering one measurements data providing unit 301 identified by the value of the index j, that there exist one distinct codebook $C_{j,0}^{(i)}$ for each parameters applying unit 304 identified by the value of the index i, i.e. it would be a non-sense in terms of overhead that said measurements data providing unit 301 has to transmit to the parameters optimizing unit 303 as many times the measurements data in quantized form as the quantity of other access points participating in the virtual MIMO channel. In order to limit overhead, a single set $\{C_{j,0}\}$ of codebooks $C_{j,0}$ is defined for all channel coefficients estimation $\tilde{h}^{(i)}$, which allows handling the worst case in view of all parameters applying unit 304 (identified by the index i); this is why "$\max_i$" appears in the formula above.

Sets $\{W_{j,0}\}$ of candidate weighting matrices $W_{j,0}$, sets $\{C_{j,0}\}$ of candidate codebooks $C_{j,0}$, and sets $\{C_{0,i}\}$ of candidate codebooks $C_{0,i}$ are randomly defined, by the quantization optimizing unit 302, until finding the set $\{W_{j,0}\}$ of weighting matrices $W_{j,0}$, the set $\{C_{j,0}\}$ of codebooks $C_{j,0}$ and the set $\{C_{0,i}\}$ of codebooks $C_{0,i}$ which statistically minimize, e.g. evaluated with a Monte-Carlo simulation, the mean-squared error between the virtual MIMO channel coefficients estimation $\tilde{h}^{(i)}$ and the virtual MIMO channel coefficients h, wherein the index i represents with regard to the virtual MIMO channel coefficients estimation $\tilde{h}^{(i)}$ the statistically worst case among the parameters applying units 304 (due to the presence of "$\max_i$" in the expression above).

In a variant, sets $\{C_{j,0}\}$ of candidate codebooks $C_{j,0}$ and sets $\{C_{0,i}\}$ of candidate codebooks $C_{0,i}$ are randomly defined, and corresponding sets $\{W_{j,0}\}$ of candidate weighting matrices $W_{j,0}$ are defined by optimization using semi-definite programming according to the sets $\{C_{j,0}\}$ of candidate codebooks $C_{j,0}$ and the sets $\{C_{0,i}\}$ of candidate codebooks $C_{0,i}$ randomly defined, by the quantization optimizing unit 302, in order to minimize, e.g. evaluated with a Monte-Carlo simulation, the mean-squared error between the virtual MIMO channel coefficients estimation $\tilde{h}^{(i)}$ and the virtual MIMO channel coefficients h, wherein the index i represents with regard to the virtual MIMO channel coefficients estimation $\tilde{h}^{(i)}$ the statistically worst case among the parameters applying units 304 (due to the presence of "$\max_i$" in the expression above).

In said second situation of said second particular embodiment, the quantization optimizing unit 302 then provides, to the measurements data providing units 301 (identified by the index j), the codebooks $C_{j,0}$ determined to be respectively applied, so that said measurements data providing units 301 are able to further transmit measurements data in quantized form $z_{j,0}$ via the link $CL_{j,0}$ to the parameters optimizing unit 303. The quantization optimizing unit 302 also provides, to the parameters applying units 304 (identified by the index i), the codebooks $C_{0,i}$ determined to be respectively applied, so that said parameters applying units 304 are able to further receive cooperation parameters, or information representative thereof, in quantized form $z_{0,i}$ via the link $CL_{0,i}$ from the parameters optimizing unit 303. When the quantization optimizing unit 302 and the parameters optimizing unit 303 are not co-localised (i.e. quantization optimization is performed by a first device of the communications network and parameters optimization is performed by a second device of the communications network), the quantization optimizing unit 302 provides, to the parameters optimizing unit 303, said determined codebooks $C_{0,i}$, so that said parameters optimizing unit 303 is able to further transmit cooperation parameters, or information representative thereof, in quantized form $z_{0,i}$ via the link $CL_{0,i}$ to the respective parameters applying units 304 (identified by the index i). Moreover, the quantization optimizing unit 302 provides, to the parameters optimizing unit 303, said determined codebooks $C_{j,0}$, so that said parameters optimizing unit 303 is able to further receive measurements data in quantized form $z_{j,0}$ via the link $CL_{j,0}$ from the respective measurements data providing units 301 (identified by the index j).

It should be noted that, although said second situation of said second particular embodiment concerns a virtual MIMO channel, the same principles are applicable to a communication system for which cooperation parameters having an impact on an environment of the communication system have to be determined, said environment being represented by measurable random variables, a figure of merit relative to performance of the communication system regarding said environment having to be optimized for determining said cooperation parameters.

Let's consider a third particular embodiment in which the random variables are still channel coefficients of a downlink virtual MIMO channel, wherein mobile terminals and/or the access points obtain transmission channel observations. Such transmission channel observations can therefore be obtained from downlink measurements and/or uplink measurements (considering that each transmission channel is symmetrical). The cooperation parameters are in this third particular embodiment precoding parameters, i.e. precoding matrices $P_i$ as defined hereafter. A master access point among said access points, or the server 100, comprises one quantization optimizing unit 302 and one parameters optimizing unit 303. In this third particular embodiment, each mobile terminal is associated with one measurements data providing unit 301. In other words, one measurements data providing unit 301 is located in each mobile terminal, which therefore may use an access point as a relay toward the one parameters optimizing unit 303; alternatively, one measurements data providing unit 301 per mobile terminal is located in the access points. Determining the codebooks to be applied to enable each parameters optimizing unit 303 to receive data measurements in quantized form is thus performed by said master access point or by said server 100. In other words, said third particular embodiment corresponds to a centralized approach as described with regard to the second modular arrangement shown in FIG. 3B in conjunction with the architecture of the third communication system shown in FIG. 1C, meaning that quantization operations are needed to provide the measurements data as well as for providing the cooperation parameters, or information representative thereof.

One main difference with regard to the first and second particular embodiments detailed above lies in the definition of the considered figure of merit, which, in said third particular embodiment, is common to all access points and corresponds to sum rate instead of mean-squared error.

The quantization optimizing unit 302 and the parameters optimizing unit 303 are considered in said third particular embodiment as co-localised in the server 100 or in the master access point for the sake of simplicity of understanding. However, the same principles apply when the quantization optimizing unit 302 and the parameters optimizing unit 303 are not co-localised (i.e. quantization optimization is performed by a first device of the communications network and parameters optimization is performed by a second device of the communications network).

Let's reuse the notations used for describing the first and second particular embodiments, and let's represent the parameters optimizing unit 303 by the index value "0".

Let's therefore consider an $N_r \times N_t$ virtual MIMO channel between $N_t$ transmit antennas and $N_r$ receive antennas, which leads to virtual MIMO channel coefficients h in the form of an $N_r \cdot N_t$ vector. Each parameters applying unit 304 (identified by the index i), applies precoding operations by relying on a precoding matrix $P_i$ that linearly combines signals intended to be respectively addressed to plural mobile terminals, under a transmit power constraint defined as follows:

$$\text{trace}(P_i P_i^H) = 1$$

Let's consider K access points (K≥2) and J mobile terminals (J≥2). The index j can therefore be used with regard to the mobile terminals, since each mobile terminal comprises one measurements data providing unit 301.

Let's denote P a concatenation of the K precoding matrices of the K respective access points:

$$P = [P_1^T, \ldots, P_K^T]^T$$

Let's further denote H' a concatenation of the J transmission channels of the virtual MIMO channel:

$$H' = [H_1'^T, \ldots, H_J'^T]$$

wherein $H_j'$ represents the transmission channel toward the mobile terminal identified by the index j.

It is further considered in said third particular embodiment that each mobile terminal (identified by the index j) is equipped with an MMSE (Minimum Mean Square Error) receive filter $T_j$ defined as follows:

$$T_j^H = \delta_j^H P^H H_j'^H (H_j' P P^H H_j'^H + I)^{-1}$$

wherein $\delta_j$ is a selection matrix isolating data addressed to the mobile terminal identified by the value of the index j such that $\delta_j S = S_j$, wherein S is the concatenation of the symbols $S_j$ respectively addressed to the mobile terminals (identified by the index j) simultaneously transmitted via the $N_t$ transmit antennas after precoding.

The figure of merit $\mathcal{F}$ is representative of the sum rate SR, to be maximized, of the virtual MIMO channel, which can be expressed as follows:

$$\mathcal{F}(P) = \max_P \ (SR) = \max_P \left( \sum_{j=1}^{J} \log \det \left( (\delta_j^H (P^H H_j'^H H_j' P + I)^{-1} \delta_j)^{-1} \right) \right)$$

Optimizing the figure of merit $\mathcal{F}$ therefore intends to determine the cooperation parameters $P_i$ that maximize the sum rate SR of the virtual MIMO channel.

Since the links $CL_{j,0}$ have a limited capacity $R_{j,0}$ in terms of data rate and the links $CL_{0,i}$ have a limited capacity $R_{0,i}$ in terms of data rate, the quantization optimizing unit 302 determines the codebooks $C_{j,0}$ and respectively the codebooks $C_{0,i}$ such that the figure of merit $\mathbb{E}$ is statistically optimized according to the virtual MIMO channel statistics.

The measurements data providing units 301 (identified by the index j) transmit the measurements data in quantized form $z_{j,0}$ to the parameters optimizing unit 303. The measurements data in quantized form $z_{j,0}$ are a quantized version of $\hat{h}^{(j)}$, according to the codebook $C_{j,0}$, wherein $\hat{h}^{(j)}$ is a vectored version of the respective measurements data $\widehat{H'_j}$ obtained regarding the transmission channel represented by H'$_j$.

The quantization optimizing unit 302 therefore has to determine the codebooks $C_{j,0}$ and the codebooks $C_{0,i}$ such that the following expression is maximized with regard to the precoding matrices $P_i$, i.e. with regard to the concatenation P:

$$\mathbb{E}_{\{\widehat{H'_j}\}} \| \max_P \sum_{j=1}^{J} \log \det\left(\left(\delta_j^H \left(P^H (CM_{j,0}(\widehat{H'_J}))^H CM_{j,0}(\widehat{H'_J})P + I\right)^{-1} \delta_j\right)^{-1}\right) \|$$

wherein P is such that each precoding matrices $P_i$ respectively belong to the codebook $C_{0,i}$, and wherein $\mathbb{E}_{\{\widehat{H'_j}\}}$ represents the mathematical expectation over the statistics of the measurements data $\widehat{H'_J}$ obtained for the transmission channel represented by H'$_j$, and wherein $CM_{j,0}$ represents the quantization operation according to the codebook $C_{j,0}$ such that the vectored version of $CM_{j,0}$ ($\widehat{H'_J}$) is equal to $CB_{j,0}$ ($\hat{h}^{(j)}$).

Sets $\{C_{j,0}\}$ of candidate codebooks $C_{j,0}$, and sets $\{C_{0,i}\}$ of candidate codebooks $C_{0,i}$ are randomly defined, by the quantization optimizing unit 302, until finding the set $\{C_{j,0}\}$ of codebooks $C_{j,0}$ and the set to $\{C_{0,i}\}$ of codebooks $C_{0,i}$ which statistically maximize, e.g. evaluated with a Monte-Carlo simulation, the sum rate of the virtual MIMO channel.

According to what precedes, during the pre-processing phase S400, the quantization optimizing unit 302 obtains statistics data relative to a probability distribution of the virtual MIMO channel coefficients, which are random variables. Said statistics are for instance based on long-term measurements of the virtual MIMO channel performed beforehand by the measurements data providing units 301 and, said long-term measurements being provided without quantization operations by each measurement data providing unit 301 to the quantization optimizing unit 302. In a variant, said statistics are obtained from a statistical model.

Then, the quantization optimizing unit 302 performs quantization optimization as described above in order to determine the set $\{C_{j,0}\}$ of codebooks $C_{j,0}$ and the set $\{C_{0,i}\}$ of codebooks $C_{0,i}$ which statistically maximize the sum rate of the virtual MIMO channel.

The quantization optimizing unit 302 then provides, to the measurements data providing units 301 (identified by the index j), the codebooks $C_{j,0}$ determined to be respectively applied, so that said measurements data providing units 301 are able to further transmit measurements data in quantized form $z_{j,0}$ via the link $CL_{j,0}$ to the parameters optimizing unit 303. The quantization optimizing unit 302 also provides, to the parameters applying units 304 (identified by the index i), the codebooks $C_{0,i}$ determined to be respectively applied, so that said parameters applying units 304 are able to further receive cooperation parameters, or information representative thereof, in quantized form $z_{0,i}$ via the link $CL_{0,i}$ from the parameters optimizing unit 303. When the quantization optimizing unit 302 and the parameters optimizing unit 303 are not co-localised (i.e. quantization optimization is performed by a first device of the communications network and parameters optimization is performed by a second device of the communications network), the quantization optimizing unit 302 provides, to the parameters optimizing unit 303, said determined codebooks $C_{0,i}$, so that said parameters optimizing unit 303 is able to further transmit cooperation parameters, or information representative thereof, in quantized form $z_{0,i}$ via the link $CL_{0,i}$ to the respective parameters applying units 304 (identified by the index i). Moreover, the quantization optimizing unit 302 provides, to the parameters optimizing unit 303, said determined codebooks $C_{j,0}$, so that said parameters optimizing unit 303 is able to further receive measurements data in quantized form $z_{j,0}$ via the link $CL_{j,0}$ from the respective measurements data providing units 301 (identified by the index j).

It should be noted that, although said third particular embodiment concerns a virtual MIMO channel, the same principles are applicable to a communication system for which cooperation parameters having an impact on an environment of the communication system have to be determined, said environment being represented by measurable random variables, a figure of merit relative to performance of the communication system regarding said environment having to be optimized for determining said cooperation parameters.

FIG. 5 schematically represents an algorithm for determining the codebooks $C_{j,i}$ (or the codebooks $C_{j,0}$) from the intermediate matrices $B_{j,i}$ (respectively $B_{j,0}$) by using a Lloyd max algorithm. Let's illustratively consider that the server 100 has to determine one codebook $C_{j,i}$ from one intermediate matrix $B_{j,i}$.

The algorithm of FIG. 5 starts in a step S500, in which the intermediate matrix $B_{j,i}$ is obtained, as previously described.

In a following step S501, the server 100 obtains a set Y of training data as follows:

$Y = \{y_1, \ldots, y_T\}$ wherein Y has the same distribution as the virtual MIMO channel coefficients h, and considering that the virtual MIMO channel is Gaussian, wherein T represents here the quantity of training data.

In the step S501, the server 100 further initialises a quantity of $U=|C_{j,i}|$ clusters $S_u$, wherein u is an index from 1 to U. In the step S501, each cluster $S_u$ is empty.

In a following step S502, the server 100 initialises the codebook $C_{j,i}$ as follows:

$C_{j,i} = \{m_1, \ldots, m_U\}$

The values $m_u$ may be arbitrarily defined, or be the codewords $x^{(j,i)}$ of a previous version of the codebook $C_{j,i}$ that was previously defined by the server 100 for preceding transmission conditions via the virtual MIMO channel.

In a following step S503, the server 100 assigns each training data of the set Y to exactly one cluster $S_u$ according to a weighted mean square distortion $dC_{j,i}$ as follows:

$S_u = \{y_t; \forall v \text{ such that } 1 \leq v \leq U, dC_{j,i}(y_t, m_u) \leq dC_{j,i}(y_t, m_v)\}$ wherein t is an index from 1 to T,
and wherein the weighted mean square distortion $dC_{j,i}$ as follows $dC_{j,i}(y_t, m_u) = (y_t - m_u)^H B_{j,i} (y_t - m_u)$ $dC_{j,i}(y_t, m_v) = (y_t - m_v)^H B_{j,i} (y_t - m_v)$ wherein the intermediate matrix $B_{j,i}$ is the weight of the distortion.

In other words, the cluster $S_u$ is filled with training data of the set Y such that the weighted mean square distortion $dC_{j,i}$ is lower for said cluster $S_u$ than for any other cluster.

In a following step S504, the server 100 updates the values $m_u$ to be the centroids of the training data assigned in the cluster $S_u$ as follows:

$$m_u = \frac{1}{|S_u|} \sum_{y_t \in S_u} y_t$$

wherein $|S_u|$ represents the cardinality of the cluster $S_u$.

In a following step S505, the server 100 checks whether convergence is considered as being reached, i.e. when the step S504 leads to unchanged values $m_u$ (stable centroid over successive iterations) or when a predefined number of iterations has been achieved. When convergence is considered as being reached, a step S506 is performed in which the algorithm ends; otherwise, each cluster $S_u$ is emptied and the step S504 is repeated.

The invention claimed is:

1. A method for setting cooperation parameters of a communication system, the communication system including a plurality of node devices directly interconnected by a link or indirectly interconnected by links via a server, the node devices being adapted to be respectively configured according to said cooperation parameters, said cooperation parameters having an impact on an environment of the communication system, said environment being represented by measurable random variables, a figure of merit relative to performance of the communication system regarding said environment having to be optimized for determining said cooperation parameters, characterised in that the method includes a cooperation phase comprising the following steps:
 gathering measurements data representative of measurements of the random variables performed at different locations within the communication system;
 determining said cooperation parameters such that said cooperation parameters lead to an optimized figure of merit relative to the performance of the communication system regarding said environment, on the basis of the obtained measurements; and
 providing said cooperation parameters, or information representative thereof, within the communication system;
 and, at least one interconnecting link between node devices of the communication system implying quantization operations for gathering said measurements data and/or for providing said cooperation parameters or the information representative thereof, each quantization operation relying on implementing a codebook associated with the link on which said quantization operation applies, the method includes beforehand a pre-processing phase comprising the following steps:
 obtaining statistics data relative to a probability distribution of said random variables; and
 determining every codebook on the basis of the figure of merit and of the probability distribution of said random variables, such that the figure of merit is statistically optimized according to the obtained statistics data.

2. The method according to claim 1, characterised in that, when plural links imply such quantization operations, the pre-processing phase comprises jointly determining the codebooks associated with said links on the basis of the figure of merit, such that the figure of merit is statistically optimized according to the obtained statistics data.

3. The method according to claim 1, characterised in that:
 at least one parameters optimizing unit gathers said measurements data and determines accordingly said cooperation parameters or the information representative thereof;
 plural measurements data providing units are respectively located at said different locations for obtaining said measurements data and providing said measurements data to the parameters optimizing unit(s);
 plural parameters applying units respectively apply said cooperation parameters; and
 at least one quantization optimizing unit determines the codebook(s) to be applied during the cooperation phase and provides the determined codebook(s) to each parameters optimizing unit, and further to each measurements data providing units that have to perform quantization operations to transmit the respective measurements data and to each parameters applying unit that is intended to receive the respective cooperation parameters, or the information representative thereof, in quantized form.

4. The method according to claim 3, characterised in that the communication system comprises one parameters optimizing unit in each node device, wherein estimation $\tilde{h}^{(i)}$ of the random variables is obtained by the parameters optimizing unit for the respective parameters applying units, identified by an index i, as follows:

$$\tilde{h}^{(i)} = \sum_j \left(W_{j,i} CB_{j,i}(\hat{h}^{(j)})\right)$$

wherein $CB_{j,i}$ represents the quantization operations performed according to the respective codebooks $C_{j,i}$, the quantization operations $CB_{j,i}$ being herein performed onto the measurements data $\hat{h}^{(j)}$ respectively obtained by the measurements data providing units, identified by an index j, and transmitted in quantized form to each parameters optimizing unit, wherein $W_{j,i}$ are positive semi-definite weighting matrices such that:

$$\sum_j W_{j,i} = I$$

wherein I is an identity matrix,
wherein the performance of the communication system regarding said environment is represented from the standpoint of each parameters optimizing unit by a figure of merit $\mathcal{F}^{(i)}$ representative of the mean-squared error between the estimation $\tilde{h}^{(i)}$ of the random variables and effective values of the random variables and that has to be minimized by said parameters optimizing unit in view of the measurements data gathered by said parameters optimizing unit,
and wherein each quantization optimizing units determines the codebooks $C_{j,i}$ and the weighting matrices $W_{j,i}$ which statistically minimize the following expression for each parameters optimizing unit that said quantization optimizing units is in charge of configuring:

$$\mathbb{E}_{h,\{\hat{h}^{(j)}\}} \| h - \sum_j \left(W_{j,i} CB_{j,i}(\hat{h}^{(j)})\right) \|^2$$

wherein h represents the random variables and $\mathbb{E}_{h,\{\hat{h}^{(j)}\}}$ represents the mathematical expectation over the statistics of the random variable h and over the measurements data $\hat{h}^{(j)}$.

5. The method according to claim 4, characterised in that each quantization optimizing unit determines the codebooks $C_{j,i}$ and the weighting matrices $W_{j,i}$ which statistically minimize the following expression for each parameters optimizing unit that said quantization optimizing units is in charge of configuring:

$$\mathbb{E}_{h,\{\hat{h}^{(j)}\}} \| h - \sum_j \left(W_{j,i} CB_{j,i}(\hat{h}^{(j)})\right) \|^2 = \sum_j \text{trace}\left(W_{j,i} Q_{z_{j,i}} W_{j,i}^\dagger\right)$$

wherein $Q_{z_{j,i}}$ represents an error covariance matrix of the measurements data transmitted in quantized form by the measurements data providing units and is expressed as follows:

$$Q_{z_{j,i}} = 2Q_j + C_h - \sum_{k=1}^{2^{R_{j,i}}} \alpha_{j,i,k} x_k^{(j,i)} x_k^{(j,i)H}$$

wherein $R_{j,i}$ represents a data rate for transmitting the measurements data from the measurements data providing units identified by the value of the index j to the parameters optimizing unit identified by the value of the index i, $C_h$ is a covariance matrix representative a probability distribution of the random variables h, and $Q_j$ represents an estimation error covariance matrix of the statistics relative to the measurements data obtained by the measurements data providing unit identified by the value of the index j, and wherein $x_k^{(j,i)}$ represents the k-th codeword from amongst codewords $x^{(j,i)}$ of the codebook $C_{j,i}$, and wherein $\alpha_{j,i,k}$ is a parameter representing a probability that the measurements data $\hat{h}^{(j)}$ belong to a Voronoi region associated to a centroid defined by the codeword $x_k^{(j,i)}$, and wherein each quantization optimizing units determines the codebooks $C_{j,i}$ and the weighting matrices $W_{j,i}$ by determining, by relying on semi-definite programming, intermediate matrices $B_{j,i}$ defined on the basis of the corresponding covariance matrices $Q_{z_{j,i}}$ according to the following system of equations:

$$\begin{cases} Q_{z_{j,i}} = Q_{C_{j,i}} + (I - (I + Q_j)^{-1})(I - (I + Q_j)^{-1})^H + \\ \quad (I + Q_j)^{-1} Q_j (I + Q_j)^{-H} \\ Q_{C_{j,i}} = 2 N^{1/2} \beta 2\pi \left(\frac{n+1}{n}\right)^{n+1} B_{j,i}^{-1} \\ \det(\Phi) = 1 \\ \Phi = \frac{1}{2} \begin{bmatrix} \mathcal{R}\left(B_{j,i}^{1/2}(I + Q_j)^{-1} B_{j,i}^{H/2}\right) & \mathfrak{J}\left(B_{j,i}^{1/2}(I + Q_j)^{-1} B_{j,i}^{H/2}\right) \\ \mathfrak{J}\left(B_{j,i}^{1/2}(I + Q_j)^{-1} B_{j,i}^{H/2}\right) & \mathcal{R}\left(B_{j,i}^{1/2}(I + Q_j)^{-1} B_{j,i}^{H/2}\right) \end{bmatrix} \end{cases}$$

wherein $Q_{C_{j,i}}$ is a quantization error covariance matrix relative to the codebook $C_{j,i}$, N represents the cardinality $|C_{j,i}|$ of the codebook $C_{j,i}$, $\beta$ represents a scalar and n represents the cardinality of the random variables h.

6. The method according to claim 4, characterised in that the communication system comprises one quantization optimizing unit in each node device, said quantization optimizing unit being in charge of configuring the parameters optimizing unit of said node device.

7. The method according to claim 4, characterised in that the communication system comprises one quantization optimizing unit in a server interconnected with each node device or in a master node device among said node devices, said quantization optimizing unit being in charge of configuring the parameters optimizing units.

8. The method according to claim 3, characterised in that the communication system comprises one parameters optimizing unit and one quantization optimizing unit in a server interconnected with each node device or in a master node device among said node devices, wherein estimation $\tilde{h}^{(0)}$ of the random variables is obtained by the parameters optimizing unit, identified by the index value "0", for each parameters applying unit as follows:

$$\tilde{h}^{(0)} = \sum_j \left(W_{j,0} CB_{j,0}(\hat{h}^{(j)})\right)$$

wherein $CB_{j,0}$ represents the quantization operations performed according to the respective codebooks $C_{j,0}$, the quantization operations $CB_{j,0}$ being herein performed onto the measurements data $\hat{h}^{(j)}$ respectively obtained by the measurements data providing units, identified by an index j, and transmitted in quantized form to the parameters optimizing unit, identified by an index j, wherein $W_{j,0}$ are positive semi-definite weighting matrices such that:

$$\sum_j W_{j,0} = I$$

wherein I is an identity matrix, wherein the performance of the communication system regarding said environment is represented by a figure of merit $\mathcal{F}$ representative of the mean-squared error between the estimation $\tilde{h}^{(0)}$ of the random variables and effective values of the random variables and that has to be minimized by the parameters optimizing unit in view of the measurements data gathered by the parameters optimizing unit, and wherein the quantization optimizing unit determines the codebooks $C_{j,0}$ and the weighting matrices $W_{j,0}$ which statistically minimize the following expression:

$$\mathbb{E}_{h,\{\hat{h}^{(j)}\}} \| h - \sum_j \left(W_{j,0} CB_{j,0}(\hat{h}^{(j)})\right) \|^2$$

wherein h represents the random variables and $\mathbb{E}_{h,\{\hat{h}^{(j)}\}}$ represents the mathematical expectation over the statistics of the random variable h and over the measurements data $\hat{h}^{(j)}$.

9. The method according to claim 8, characterised in that the quantization optimizing unit determines the codebooks $C_{j,0}$ and the weighting matrices $W_{j,0}$ which statistically minimize the following expression:

$$\mathbb{E}_{h,\{\hat{h}^{(j)}\}} \| h - \sum_j \left(W_{j,0} CB_{j,0}(\hat{h}^{(j)})\right) \|^2 = \sum_j \text{trace}\left(W_{j,0} Q_{z_{j,0}} W_{j,0}^\dagger\right)$$

wherein $Q_{z_{j,0}}$ represents an error covariance matrix of the measurements data transmitted in quantized form by the measurements data providing units and is expressed as follows:

$$C_{z_{j,0}} = 2Q_j + C_h - \sum_{k=1}^{2^{R_{j,0}}} \alpha_{j,0,k} x_k^{(j,0)} x_k^{(j,0)H}$$

wherein $R_{j,0}$ represents a data rate for transmitting the measurements data from the measurements data providing units identified by the value of the index j to the parameters optimizing unit, $C_h$ represents a covariance matrix representative a probability distribution of the random variables h, and $Q_j$ represents an estimation error covariance matrix of the statistics relative to the measurements data obtained by the measurements data providing unit identified by the value of the index j, and wherein $x_k^{(j,0)}$ represents the k-th codeword from amongst codewords $x^{(j,0)}$ of the codebook $C_{j,0}$, and wherein $\alpha_{j,0,k}$ is a parameter representing a probability that the measurements data $\hat{h}^{(j)}$ belong to a Voronoi region associated to a centroid defined by the codeword $x_k^{(j,0)}$, and wherein the quantization optimizing unit determines the codebooks $C_{j,0}$ and the weighting matrices $W_{j,0}$ by determining, by relying on semi-definite programming, intermediate matrices $B_{j,0}$ defined on the basis of the corresponding covariance matrices $Q_{z_{j,0}}$ according to the following system of equations:

$$\begin{cases} Q_{z_{j,0}} = Q_{C_{j,0}} + (I - (I+Q_j)^{-1}) \\ (I-(I+Q_j)^{-1})^H + (I+Q_j)^{-1} Q_j (I+Q_j)^{-H} \\ Q_{C_{j,0}} = 2 N'^{1/n} \beta' 2\pi \left(\frac{n+1}{n}\right)^{n+1} B_{j,0}^{-1} \\ \det(\Phi) = 1 \\ \Phi = \frac{1}{2} \begin{bmatrix} \mathcal{R}\left(B_{j,0}^{1/2}(I+Q_j)^{-1} B_{j,0}^{H/2}\right) & \mathfrak{I}\left(B_{j,0}^{1/2}(I+Q_j)^{-1} B_{j,0}^{H/2}\right) \\ \mathfrak{I}\left(B_{j,0}^{1/2}(I+Q_j)^{-1} B_{j,0}^{H/2}\right) & \mathcal{R}\left(B_{j,0}^{1/2}(I+Q_j)^{-1} B_{j,0}^{H/2}\right) \end{bmatrix} \end{cases}$$

wherein $Q_{C_{j,0}}$ is a quantization error covariance matrix relative to the codebook $C_{j,0}$, N' represents the cardinality of the codebook $C_{j,0}$, $\beta'$ represents a scalar, and n represents the cardinality of the random variables h.

10. The method according to claim 3, characterised in that the communication system comprises one parameters optimizing unit and one quantization optimizing unit in a server interconnected with each node device or in a master node device among said node devices, wherein estimation $\hat{h}^{(i)}$ of the random variables is obtained by the parameters optimizing unit, identified by the index value "0", on behalf of each parameters applying unit, identified by the index i, as follows:

$$\hat{h}^{(i)} = \sum_j \left(W_{j,0}^{(i)} z_{j,0}\right) = \sum_j \left(W_{j,0}^{(i)} CB_{j,0}(\hat{h}^{(j)})\right)$$

wherein $CB_{j,0}$ represents the quantization operations performed according to the respective codebooks $C_{j,0}$, the quantization operations $CB_{j,0}$ being herein performed onto the measurements data $\hat{h}^{(j)}$ respectively obtained by the measurements data providing units, identified by an index j, and transmitted in quantized form to the parameters optimizing unit, and wherein $W_{j,0}^{(i)}$ are positive semi-definite weighting matrices determined by the quantization optimizing unit for said parameters applying unit identified by the index i such that:

$$\sum_j W_{j,0}^{(i)} = I$$

wherein I is an identity matrix, wherein the performance of the communication system regarding said environment is represented from the standpoint of the parameters optimizing unit for each parameters applying unit, identified by the index i, by a figure of merit $\mathcal{F}^{(i)}$ representative of the mean-squared error between the estimation $\hat{h}^{(i)}$ of the random variables and effective values of the random variables and that has to be minimized by said parameters optimizing unit in view of the measurements data gathered by said parameters optimizing unit, and wherein the quantization optimizing unit determines the codebooks $C_{j,0}$, the weighting matrices $W_{j,0}^{(i)}$ and the codebooks $C_{i,0}$, which statistically minimize the following expression:

$$\max_i \left( \mathbb{E}_{h,\{\hat{h}^{(j)}\}} \| h - CB_{0,i}\left(\sum_j \left(W_{j,0}^{(i)} CB_{j,0}(\hat{h}^{(j)})\right)\right) \|^2 \right)$$

wherein h represents the random variables and $\mathbb{E}_{h,\{\hat{h}^{(j)}\}}$ represents the mathematical expectation over the statistics of the random variable h and over the measurements data $\hat{h}^{(j)}$.

11. The method according to claim 1, characterized in that the random variables are coefficients of a virtual Multiple-Input Multiple-Output channel between the node devices acting as access points for mobile terminals with which the virtual Multiple-Input Multiple-Output channel is set up.

12. The method according to claim 3, characterised in that the communication system comprises one parameters optimizing unit and one quantization optimizing unit in a server interconnected with each node device or in a master node device among said node devices, the random variables being coefficients of a virtual Multiple-Input Multiple-Output channel between the node devices acting as access points for mobile terminals with which the virtual Multiple-Input Multiple-Output channel is set up, the cooperation parameters being precoding matrices applied by the node devices for transmitting symbols $S_j$ to the mobile terminals, identified by an index j, via respective transmission channels $H'_j$, one measurements data providing units being defined per mobile terminal, each mobile terminal being equipped with a Minimum Mean Square Error receive filter $T_j$ defined as follows:

$$T_j^H = \delta_j^H P^H H_j'^H (H_j' P P^H H_j'^H + 1)^{-1}$$

wherein $\delta_j$ is a selection matrix isolating data addressed to the mobile terminal identified by the value of the index j such that $\delta_j S = S_j$, wherein S is a concatenation of the symbols $S_j$ respectively addressed to the mobile terminals, identified by the index j, and simultaneously transmitted after precoding by the node devices, wherein the performance of the communication system regarding said environment is represented by the figure of merit $\mathcal{F}$ that is representative of a sum rate of the virtual Multiple-Input Multiple-Output channel and that has to be maximized by said parameters optimizing unit in view of the measurements data gathered by said parameters optimizing unit:

$$\mathcal{F}(P) = \max_P \left( \sum_{j=1}^{J} \log \det\left( (\delta_j^H (P^H H'^H_j H'_j P + I)^{-1} \delta_j)^{-1} \right) \right)$$

wherein P is a concatenation of the precoding matrices, wherein the quantization optimizing unit determines codebooks $C_{j,0}$ and codebooks $C_{0,i}$ such that the following expression is maximized with regard to the concatenation P of the precoding matrices:

$$\mathbb{E}_{\{\widehat{H'_j}\}} \left\| \max_P \sum_{j=1}^{J} \log \det\left( (\delta_j^H (P^H (CM_{j,0}(\widehat{H'_j}))^H CM_{j,0}(\widehat{H'_j}) P + I)^{-1} \delta_j)^{-1} \right) \right\|$$

wherein P is such that each precoding matrices respectively belong to the codebook $C_{0,i}$ and wherein $\mathbb{E}_{\{\widehat{H'_j}\}}$ represents the mathematical expectation over the statistics of measurements data $\widehat{H'_j}$ obtained for the respective transmission channel represented by $H'_j$, and wherein $CM_{j,0}$ represents the quantization operation according to the codebook $C_{j,0}$.

13. A computer program product when executed on a programmable device, cause the programmable device to perform all the steps of claim 1.

14. A communication system including a plurality of node devices directly interconnected by a link or indirectly interconnected by links via a server, the node devices being adapted to be respectively configured according to cooperation parameters having an impact on an environment of the communication system, said environment being represented by measurable random variables, a figure of merit relative to performance of the communication system regarding said environment having to be optimized for determining said cooperation parameters, characterised in that the communication system implements for performing a cooperation phase:

means for gathering measurements data representative of measurements of the random variables performed at different locations within the communication system;

means for determining said cooperation parameters such that said cooperation parameters lead to an optimized figure of merit relative to the performance of the communication system regarding said environment, on the basis of the obtained measurements; and means for providing said cooperation parameters, or information representative thereof, within the communication system;

and, at least one interconnecting link between node devices of the communication system implying quantization operations for gathering said measurements data and/or for providing said cooperation parameters or the information representative thereof, each quantization operation relying on implementing a codebook associated with the link on which said quantization operation applies, the communication system implements, for performing beforehand a pre-processing phase:

means for obtaining statistics data relative to a probability distribution of said random variables; and means for determining every codebook on the basis of the figure of merit and of the probability distribution of said random variables, such that the figure of merit is statistically optimized according to the obtained statistics data.

* * * * *